United States Patent
Hummelt et al.

(10) Patent No.: US 11,585,331 B2
(45) Date of Patent: Feb. 21, 2023

(54) PIERCED WAVEGUIDE THRUSTER

(71) Applicant: MOMENTUS SPACE LLC, San Jose, CA (US)

(72) Inventors: Jason Hummelt, San Jose, CA (US); Vladlen Podolsky, San Jose, CA (US); Nicolas Gascon, Moss Beach, CA (US)

(73) Assignee: MOMENTUS SPACE LLC, San Jose, CA (US)

( * ) Notice: Subject to any disclaimer, the term of this patent is extended or adjusted under 35 U.S.C. 154(b) by 105 days.

(21) Appl. No.: 17/163,049

(22) Filed: Jan. 29, 2021

(65) Prior Publication Data

US 2021/0262455 A1 Aug. 26, 2021

Related U.S. Application Data

(63) Continuation-in-part of application No. 16/773,908, filed on Jan. 27, 2020, now Pat. No. 10,910,198.

(60) Provisional application No. 62/819,350, filed on Mar. 15, 2019, provisional application No. 62/817,190, filed on Mar. 12, 2019.

(51) Int. Cl.
*B64G 1/40* (2006.01)
*F03H 1/00* (2006.01)

(52) U.S. Cl.
CPC ........... *F03H 1/0093* (2013.01); *B64G 1/405* (2013.01)

(58) Field of Classification Search
CPC ........ F03H 1/0093; B64G 1/405; B64G 1/409
See application file for complete search history.

(56) References Cited

U.S. PATENT DOCUMENTS

| | | | | |
|---|---|---|---|---|
| 3,825,211 A * | 7/1974 | Minovitch | ............. | B64G 1/409 244/171.1 |
| 5,956,938 A * | 9/1999 | Brandenburg | ........ | F03H 1/0093 60/203.1 |
| 6,205,769 B1 * | 3/2001 | Brandenburg | ........ | F03H 1/0093 60/203.1 |
| 6,298,659 B1 * | 10/2001 | Knuth | ....................... | F02K 9/62 60/258 |
| 6,334,302 B1 * | 1/2002 | Chang-Diaz | .......... | F03H 1/0093 60/203.1 |
| 7,037,484 B1 * | 5/2006 | Brandenburg | ......... | B01J 19/088 204/157.52 |

(Continued)

FOREIGN PATENT DOCUMENTS

| | | |
|---|---|---|
| WO | WO-2017/085746 A1 | 5/2017 |
| WO | WO-2020/033009 A2 | 2/2020 |
| WO | WO-2020033009 A9 * | 5/2020 |

OTHER PUBLICATIONS

2017/085746, WO.

(Continued)

*Primary Examiner* — Tye William Abell
(74) *Attorney, Agent, or Firm* — Marshall, Gerstein & Borun LLP

(57) ABSTRACT

The disclosed propulsion system of a space vehicle and the methods of operating the propulsion system use a microwave energy source to heat propellant in a propellant chamber that pierces and traverses a waveguide carrying the microwave energy. In some implementations, the microwave energy ionizes and further heats the propellant in the propellant chamber. The partially ionized and heated propellant may exit the propellant chamber via a nozzle to generate thrust.

25 Claims, 24 Drawing Sheets

(56) References Cited

U.S. PATENT DOCUMENTS

| | | | |
|---|---|---|---|
| 7,452,513 B2* | 11/2008 | Matveev | F23C 3/006 |
| | | | 422/186 |
| 2017/0158359 A1* | 6/2017 | Fetta | B64G 1/409 |
| 2018/0327118 A1* | 11/2018 | Ganapathy | B64G 1/409 |

OTHER PUBLICATIONS

2020/033009, WO.

Partial International Search Report for Application No. PCT/US2020/022404, dated Aug. 26, 2020.

Sullivan et al., "Development of a Microwave Resonant Cavity Electrothermal Thruster Prototype," 23rd International Electric Propulsion Conference (1993).

Sullivan et al., "Performance Testing and Exhaust Plume Characterization of the Microwave Arcjet Thruster," 30th Joint Propulson Conference and Exhibit (1994).

Micci, "Low-Power Solid-State Microwave Thruster Systems," Spacecraft Propulson, Third International Conference (2000).

International Search Report and Written Opinion for Application No. PCT/US2020/022404, dated Oct. 21, 2020.

\* cited by examiner

PIERCED WAVEGUIDE THRUSTER

CROSS-REFERENCE TO RELATED APPLICATION

This Application is a Continuation-in-part of application Ser. No. 16/773,908 filed on Jan. 27, 2020. Application Ser. No. 16/773,908 claims the benefit of U.S. Provisional Application 62/819,350 filed on Mar. 15, 2019. Application Ser. No. 16/773,908 claims the benefit of U.S. Provisional Application 62/817,190 filed on Mar. 12, 2019. The entire contents of these applications are incorporated herein by reference in their entirety.

FIELD OF THE DISCLOSURE

The present disclosure generally relates to spacecraft thrusters and, more particularly, to a pierced-waveguide thruster with a dielectric propellant cavity traversing a microwave waveguide which energizes the propellant to produce thrust.

BACKGROUND

With increased commercial and government activity in Near Space, a variety of spacecraft and missions are under development. For example, a spacecraft may be dedicated to delivering payloads such as satellites from one orbit to another, clean up space debris, make deliveries to space stations, etc.

Maneuvering spacecraft within an orbit and changing orbit elevation requires flexible and efficient thrusters with various form factors. Thrusters in which propellant is energized using electrical or electromagnetic sources introduce challenges in efficiency of energy transfer, miniaturization, and design flexibility.

SUMMARY

In one embodiment, a propulsion system for a space vehicle comprises a source of microwave energy and a waveguide coupled to the source of microwave energy, where the waveguide is configured to have a propagation direction. The system further comprises a primary propellant chamber piercing the waveguide orthogonally to the direction of propagation of the waveguide, where the primary propellant chamber has an ingress port and an egress port. The system further comprises a propellant injection mechanism configured to inject propellant into the propellant chamber via the ingress port. Still further, the system comprises a controller, configured to cause the propellant injection mechanism to inject the propellant into the primary propellant chamber and cause the source of microwave energy to supply energy to the propellant in the primary propellant chamber via the waveguide, to thereby heat the propellant and cause the heated propellant to exit the primary propellant chamber via the egress port.

In another embodiment, a method of operating a propulsion system in a space vehicle comprises generating microwave energy using a source of microwave energy and coupling the generated microwave energy to a waveguide, where the waveguide configured to have a propagation direction. The method further comprises injecting, via an ingress port using a propellant injection mechanism controlled by a controller, propellant into a primary propellant chamber piercing the waveguide orthogonally to the direction of propagation of the waveguide. The method further comprises supplying, via the waveguide, energy to the propellant in the primary propellant chamber to thereby heat the propellant and cause the heated propellant to exit the primary propellant chamber via an egress port.

DETAILED DESCRIPTION

Generally speaking, the disclosed propulsion system of a space vehicle and the methods of operating the propulsion system use a microwave energy source to heat propellant in a propellant chamber that pierces and traverses a waveguide carrying the microwave energy. In some implementations, the microwave energy ionizes and further heats the propellant in the propellant chamber. The partially ionized and heated propellant may exit the propellant chamber via a nozzle to generate thrust. In another example implementation, the ionized propellant may exit the propellant chamber, which may be referred to as a primary propellant chamber, into another, secondary, propellant chamber. An energy source disposed at the secondary propellant chamber may further heat the propellant, which may exit the secondary chamber via a nozzle to generate thrust. A variety of additional or alternative elements and features are described below.

The disclosed techniques advantageously provide dielectric propellant chamber dimensions that are independent of the waveguide dimensions and wavelength. Further, these techniques can provide a more compact thruster to better utilize the mass and volume envelope of the spacecraft. Furthermore, the disclosed techniques can facilitate propellant plasma confinement, leading to stable and reliable thruster configurations.

Figure 1:
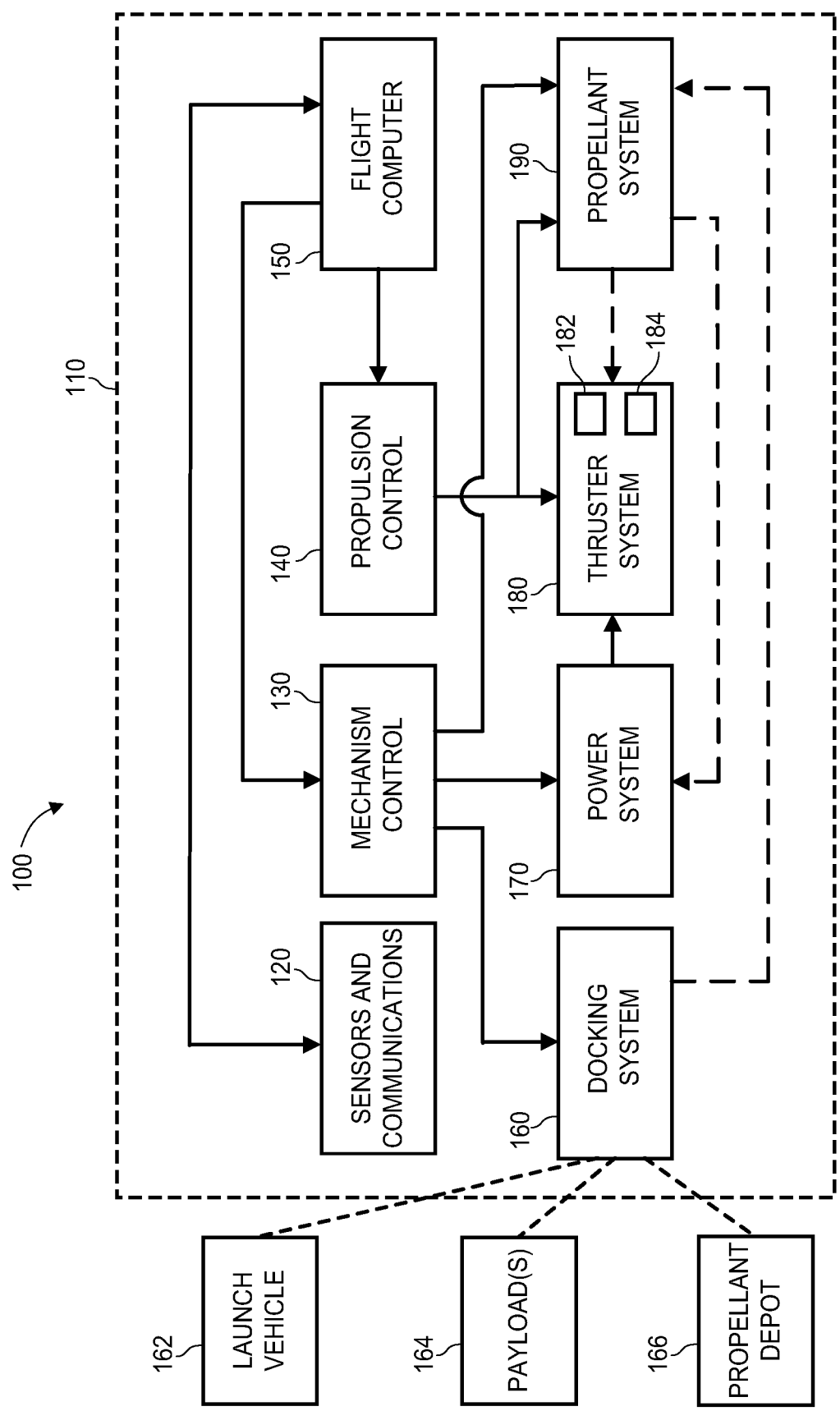
FIG. 1 is a block diagram of an example spacecraft in which the techniques of this disclosure can be implemented.

FIG. 1 is a block diagram of a spacecraft 100 configured for transferring a payload between orbits. The spacecraft 100 includes several subsystems, units, or components disposed in or at a housing 110. The subsystems of the spacecraft 100 may include sensors and communications components 120, mechanism control 130, propulsion control 140, a flight computer 150, a docking system 160 (for attaching to a launch vehicle 162, one or more payloads 164, a propellant depot 166, etc.), a power system 170, a thruster system 180 that includes a first thruster 182 and a second thruster 184, and a propellant system 190. Furthermore, any combination of subsystems, units, or components of the spacecraft 100 involved in determining, generating, and/or supporting spacecraft propulsion (e.g., the mechanism control 130, the propulsion control 140, the flight computer 150, the power system 170, the thruster system 180, and the propellant system 190) may be collectively referred to as a propulsion system of the spacecraft 100.

The sensors and communications components 120 may several sensors and/or sensor systems for navigation (e.g., imaging sensors, magnetometers, inertial motion units (IMUs), Global Positioning System (GPS) receivers, etc.), temperature, pressure, strain, radiation, and other environmental sensors, as well as radio and/or optical communication devices to communicate, for example, with a ground station, and/or other spacecraft. The sensors and communications components 120 may be communicatively connected with the flight computer 150, for example, to provide the flight computer 150 with signals indicative of information about spacecraft position and/or commands received from a ground station.

The flight computer 150 may include one or more processors, a memory unit, computer readable media, to process signals received from the sensors and communications components 120 and determine appropriate actions according to instructions loaded into the memory unit (e.g., from the computer readable media). Generally, the flight computer 150 may be implemented any suitable combination of processing hardware, that may include, for example, applications specific integrated circuits (ASICs) or field programmable gate arrays (FPGAs), and/or software components. The flight computer 150 may generate control messages based on the determined actions and communicate the control messages to the mechanism control 130 and/or the propulsion control 140. For example, upon receiving signals indicative of a position of the spacecraft 100, the flight computer 150 may generate a control message to activate one of the thrusters 182, 184 in the thruster system 180 and send the message to the propulsion control 140. The flight computer 150 may also generate messages to activate and direct sensors and communications components 120.

The docking system 160 may include a number of structures and mechanisms to attach the spacecraft 100 to a launch vehicle 162, one or more payloads 164, and/or a propellant refueling depot 166. The docking system 160 may be fluidicly connected to the propellant system 190 to enable refilling the propellant from the propellant depot 166. Additionally or alternatively, in some implementations at least a portion of the propellant may be disposed on the launch vehicle 162 and outside of the spacecraft 100 during launch. The fluidic connection between the docking system 160 and the propellant system 190 may enable transferring the propellant from the launch vehicle 162 to the spacecraft 100 upon delivering and prior to deploying the spacecraft 100 in orbit.

The power system 170 may include components (discussed in the context of FIGS. 4-7) for collecting solar energy, generating electricity and/or heat, storing electricity and/or heat, and delivering electricity and/or heat to the thruster system 180. To collect solar energy into the power system 170, solar panels with photovoltaic cells, solar collectors or concentrators with mirrors and/or lenses, or a suitable combination of devices may collect solar energy. In the case of using photovoltaic devices, the power system 170 may convert the solar energy into electricity and store it in energy storage devices (e.g., lithium ion batteries, fuel cells, etc.) for later delivery to the thruster system 180 and other spacecraft components. In some implementations, the power system 180 may deliver at least a portion of the generated electricity directly to the thruster system 180 and/or to other spacecraft components. When using a solar concentrator, the power system 170 may direct the concentrated (having increased irradiance) solar radiation to photovoltaic solar cells to convert to electricity. In other implementations, the power system 170 may direct the concentrated solar energy to a solar thermal receiver or simply, a thermal receiver, that may absorb the solar radiation to generate heat. The power system 170 may use the generated heat to power a thruster directly, as discussed in more detail below, to generate electricity using, for example, a turbine or another suitable technique (e.g., a Stirling engine). The power system 170 then may use the electricity directly for generating thrust or store electric energy as briefly described above, or in more detail below.

The thruster system 180 may include a number of thrusters and other components configured to generate propulsion or thrust for the spacecraft 100. Thrusters may generally include main thrusters that are configured to substantially change speed of the spacecraft 100, or as attitude control thrusters that are configured to change direction or orientation of the spacecraft 100 without substantial changes in speed. In some implementations, the first thruster 182 and the second thruster 184 may both be configured as main thrusters, with additional thrusters configured for attitude control. The first thruster 182 may operate according to a first propulsion technique, while the second thruster 184 may operate according to a second propulsion technique.

For example, the first thruster 182 may be a microwave-electro-thermal (MET) thruster. In a MET thruster cavity, an injected amount of propellant may absorb energy from a microwave source (that may include one or more oscillators) included in the thruster system 180 and, upon partial ionization, further heat up, expand, and exit the MET thruster cavity through a nozzle, generating thrust.

The second thruster 184 may be a solar thermal thruster. In one implementation, propellant in a thruster cavity acts as the solar thermal receiver and, upon absorbing concentrated solar energy, heats up, expands, and exits the nozzle generating thrust. In other implementations, the propellant may absorb heat before entering the cavity either as a part of the thermal target or in a heat exchange with the thermal target or another suitable thermal mass thermally connected to the thermal target. In some implementations, while the propellant may absorb heat before entering the thruster cavity, the thruster system 180 may add more heat to the propellant within the cavity using an electrical heater or directing a portion of solar radiation energy to the cavity.

The propellant system 190 may store the propellant for use in the thruster system 180. The propellant may include water, hydrogen peroxide, hydrazine, ammonia or another suitable substance. The propellant may be stored on the spacecraft in solid, liquid, and/or gas phase. To that end, the propellant system 190 may include one or more tanks. To move the propellant within the spacecraft 100, and to deliver the propellant to one of the thrusters, the propellant system may include one or more pumps, valves, and pipes. As described below, the propellant may also store heat and/or facilitate generating electricity from heat, and the propellant system 190 may be configured, accordingly, to supply propellant to the power system 170.

The mechanism control 130 may activate and control mechanisms in the docking system 160 (e.g., for attaching and detaching payload or connecting with an external propellant source), the power system 170 (e.g., for deploying and aligning solar panels or solar concentrators), and/or the propellant system (e.g., for changing configuration of one or more deployable propellant tanks). Furthermore, the mechanism control 130 may coordinate interaction between subsystems, for example, by deploying a tank in the propellant system 190 to receive propellant from an external source connected to the docking system 160.

The propulsion control 140 may coordinate the interaction between the thruster system 140 and the propellant system 190, for example, by activating and controlling electrical components (e.g., a microwave source) of the thruster system 140 and the flow of propellant supplied to thrusters by the propellant system 190. Additionally or alternatively, the propulsion control 140 may direct the propellant through elements of the power system 170. For example, the propellant system 190 may direct the propellant to absorb the heat (e.g., at a heat exchanger) accumulated within the power system 170. Vaporized propellant may then drive a power plant (e.g., a turbine, a Stirling engine, etc.) of the power system 170 to generate electricity. Additionally or alternatively, the propellant system 190 may direct some of the propellant to charge a fuel cell within the power system 190.

The subsystems of the spacecraft may be merged or subdivided in different implementations. For example, a single control unit may control mechanisms and propulsion. Alternatively, dedicated controllers may be used for different mechanisms (e.g., a pivot system for a solar concentrator), thrusters (e.g., a MET thruster), valves, etc. In the following discussion, a controller may refer to any portion or combination of the mechanism control 130 and/or propulsion control 140.

Figure 2:
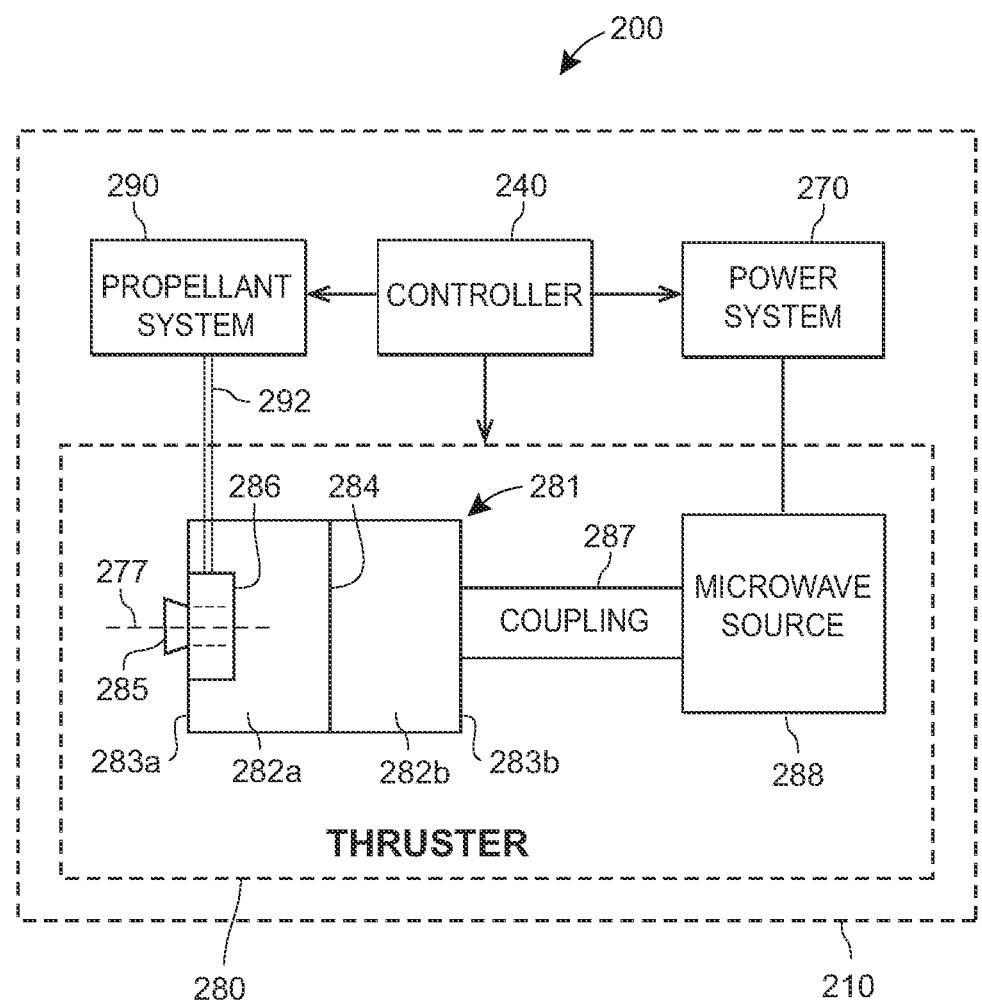
FIG. 2 illustrates an example thruster system that can operate in the spacecraft of FIG. 1.

FIG. 2 illustrates a MET thruster system 280 operating within a spacecraft system 210 that also includes a controller 240, a power system 270, and a propellant system 290. The MET thruster system 280 includes a resonant cavity 281 with a thrust axis 277, separated into a propellant compartment 282a and a microwave coupling compartment 282b. The resonant cavity 281 also can be referred to as a chamber (e.g., propulsion chamber, resonant chamber, etc.) or a resonator. Relative to a nominal orientation of the thruster 281, the propellant compartment 282a may be referred to as an upper cavity, and the microwave coupling compartment 282b may be referred to as a lower cavity. The resonant cavity 281 extends between a top plate 283a and a bottom plate 283b, and is separated into the two compartments 282a,b by a dielectric window 284. A nozzle 285 may be disposed trough the top plate 283a, with the top plate 283a substantially surrounding the nozzle 285. A propellant injection structure 286 may be disposed at the top plate 283a (e.g., included into an annular structure that extends into the cavity 281) or at another suitable location in the propellant compartment 282a. The propellant injection structure 286 may be fluidicly coupled to the propellant system 290 via a supply line 292. The injection structure 286 may include one or more injectors configured to inject propellant into the propellant compartment 282a of the resonant cavity 281 so as to create a rotating circumferential flow.

The resonant cavity may be made of metal or another suitable material. In some implementations, the resonant cavity may be made of a ceramic material with a metal coating in order to improve thermal and conductive properties.

The microwave coupling compartment 282b of the resonant cavity 281 may electromagnetically couple via a coupling structure 287 to a microwave source 288. In some implementations, the coupling structure 287 couples energy into the cavity 281 via an evanescent electromagnetic field. The microwave source may include one or more microwave generators or oscillators (e.g., magnetrons, solid-state Colpitts circuits, etc.), amplifiers, phase controllers, switches, and/or other suitable microwave circuits and devices. Combining multiple oscillators in a microwave source 288 is discussed in reference to FIGS. 3A and 3B. The microwave coupling structure 287 may include a coaxial cable terminated with a probe or an antenna, or a waveguide terminated with one or more apertures to couple electromagnetic energy generated by the microwave source 288 to a mode (or multiple modes) of the resonant cavity 281. Furthermore, the coupling structure may include impedance matching or tuning elements (e.g., stubs, quarter-wave transformers, etc.). Example coupling structures are discussed with reference to FIGS. 6A,B and 7A,B. By way of the coupling structure 287, the microwave source 288 generates standing waves with spatial power distribution defined by the excited modes in the resonant cavity 281.

In operation of the thruster system 280, the power delivered to the mode(s) of the resonant cavity 281 may ionize a portion of the injected propellant, creating plasma that subsequently absorbs more electromagnetic energy. The energy absorbed by the plasma heats the surrounding propellant that increases in temperature and pressure and escapes the propellant compartment 282a through the nozzle 285 to generate thrust. Substantially confining the plasma to a suitable region near an inlet of the nozzle 285 increases efficiency of the thruster system 280. One way of confining the plasma is to introduce rotating circumferential flow of the injected propellant, as briefly discussed above and, in more details with reference to FIGS. 8A, 8B.

Alternative implementations of the thruster system 210 may not include a resonant cavity 281 (e.g., as discussed with reference to FIG. 4) or may integrate the resonant cavity into the coupling structure 287 (e.g., as discussed with reference to FIG. 5).

In some implementations, the thruster system 280 may be implemented at least in part on a circuit board, with integrated and discrete components. Solid-state oscillators may be used to implement the microwave source 288. Microstrip and coplanar or other suitable transmission lines can implement the coupling 287, and at least a portion of the propellant cavity 281 may be etched through the circuit board.

Further, in some implementations, additional components may surround the portion of the nozzle 285 outside the resonant cavity 281. The components may be configured for further heating the gas exiting the nozzle 285 and/or for directing the flow of the exiting gas by static or electric or magnetic field. In this manner, the thruster can improve specific thrust ISP.

In some implementations, the MET thruster system 280 can be configured to operate in a MET mode as well as a chemical propulsion mode. When operating in the chemical propulsion mode, the MET thruster system 280 can generate thrust by forming a hot gas in the cavity 281 using a reduction-oxidation reaction between a first fluid (e.g., hydrozene) and a second fluid (e.g., hydrogen peroxide). The first and second fluids can operate as reducing and oxidizing agents, respectively. Moreover, the same fluid (e.g., hydrozene) can function as the propellant in the MET mode of operation as well as one of the agents in the chemical mode of operation. Still further, the MET thruster system 280 in some implementations can employ fuel cells that store oxygen and hydrogen separately, and thus the same fluid, water, can be used as a propellant ion the MET mode of operation and as a source of the reducing and oxidizing agents in the chemical mode of operation.

Figure 3A:
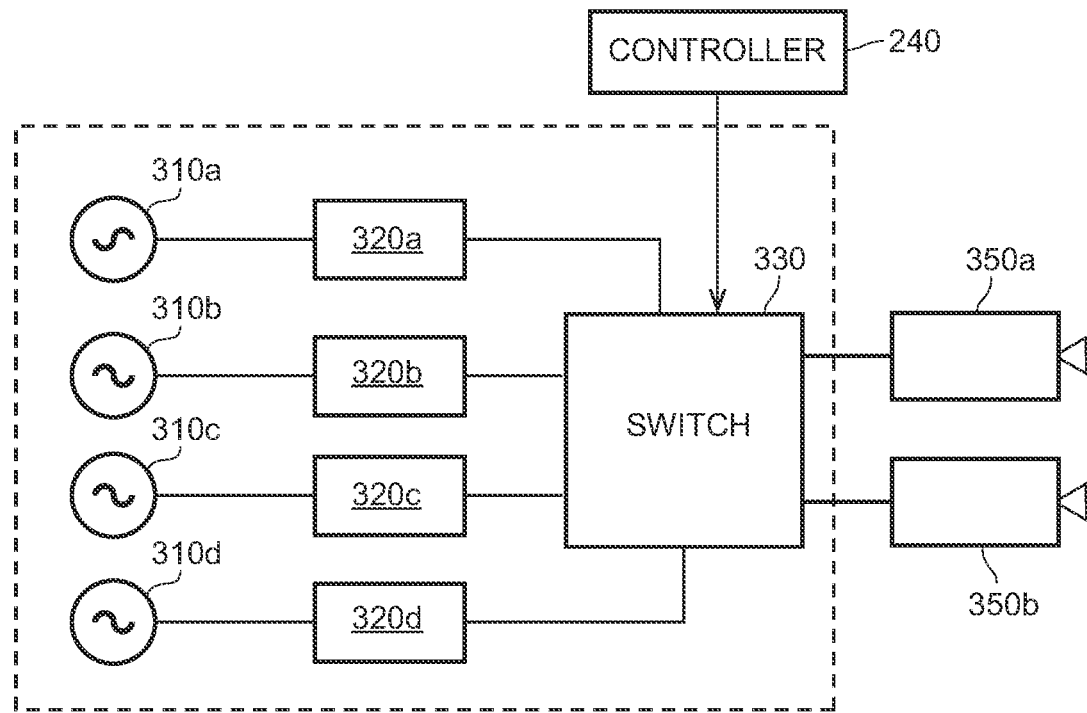
FIG. 3A is a block diagram of an example source of microwave power that includes multiple microwave generators, and that can power one or more thrusters, in a redundant and/or combined manner.

FIG. 3A illustrates an architecture for directing signals from multiple microwave oscillators or generators to one or more MET thrusters. The example architecture includes four generators 310a-d, each generating a respective signal. The signals may be substantially continuous wave (CW) signals in the range of 1-20 GHz. In some implementations, the signals may have substantially different frequencies (e.g., with frequency differences no less than 1 kHz, 10 kHz, 100 kHz or another suitable minimum difference). In other implementations, the signals may have substantially similar frequencies (e.g., with frequency differences less than 1 kHz, 100 Hz, 10 Hz or another suitable minimum difference). The architecture 300 may include phase adjustment components 320a-d configured to adjust the phase of each of the corresponding signals corresponding to each of the generators 310a-d. The architecture 300 may then direct the phase-shifted signals to a switching network 330. The switching network 340 may include a suitable number of routing devices, including splitters, combiners, electro-mechanical switches, micro-electro-mechanical system (MEMS) switches, solid state switches, etc. The switching network 340 may provide an output to one of two MET thrusters 350a,b. In some implementations, only one MET thruster may be used, while more than two MET thrusters may be used in other implementations.

Some of the generators 310a-d may be configured to phase-lock to generate signals of substantially the same frequency and with substantially consistent pair-wise phase differences between phase difference between phase-locked generators. In some implementations, the phase adjustment components 320a-d may be filters. In other implementations, the phase adjustment components 320a-d may be delay lines. In either case, the phase-adjustment components 320a-d may be tunable. In some implementations, a controller adjusts the phases of the components 320a-d to facilitate phase-locking or to increase the power output of the combined signals.

The switching network 340 may direct output to a single MET thruster (i.e., coupling energy into the resonant cavity of the MET thruster). In other implementations, the switching network may direct one portion of the output to one thruster and another portion of the output to another thruster. In a redundant MET thruster system that includes multiple microwave generators 310a-d and multiple MET thrusters 350a,b, the switching network 340 may direct a subset of the signals generated by the generators 310a-d, to one or both of the MET thrusters 350a,b.

Figure 3B:
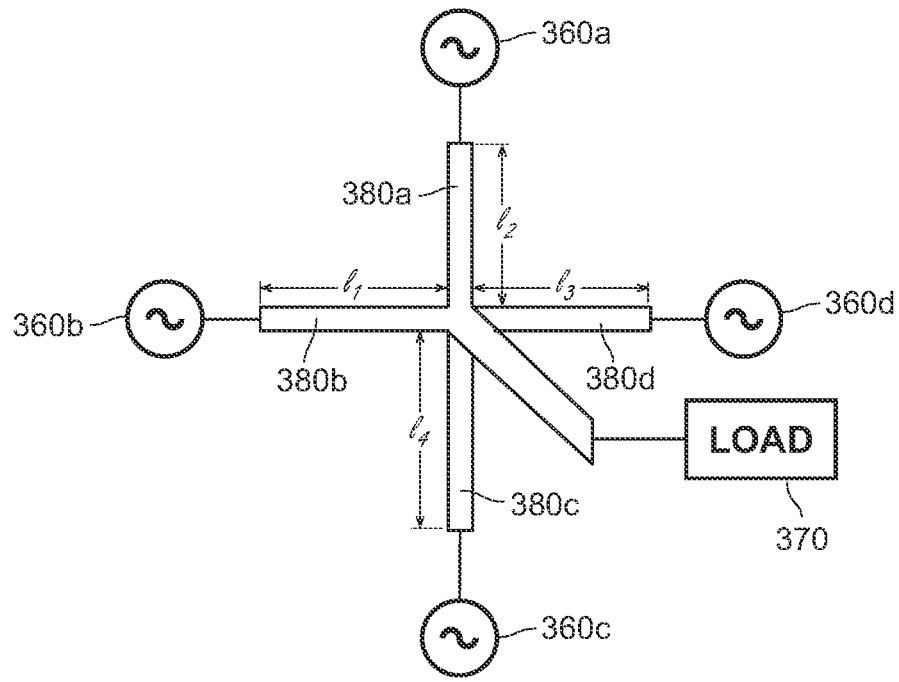
FIG. 3B schematically illustrates an example placement of multiple microwave generators relative to a load.

FIG. 3B illustrates an example three-dimensional placement of microwave oscillators or generators 360a-d relative to a load 370, which can be the resonant cavity, for example (such as the resonant cavity 281 discussed with reference to FIG. 2). The generators 360a-d are interconnected via respective transmission or wave guides 380a-d. The lengths of the guides 380a-d can be adjusted so that the generators 360a-d are phase-locked and configured to increase the power delivered to the load 370.

Figure 4:
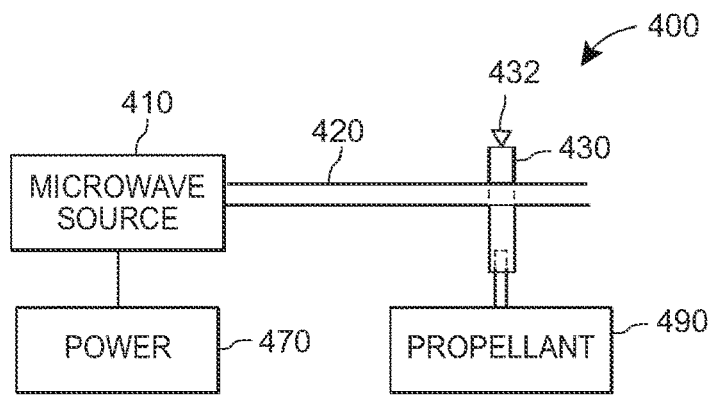
FIG. 4 is a block diagram of an example thruster system in which a propellant compartment is disposed through a waveguide (i.e., a pierced waveguide thruster system), so as to eliminate the need for a dedicated resonant cavity.

FIG. 4 illustrates a MET thruster configuration 400 that does not require a resonant cavity. Instead, the microwave source 410 delivers energy via a waveguide 420 to a propellant compartment 430 disposed through the waveguide 420. The propellant compartment 430 includes a nozzle 432. The microwave energy delivered to the propellant compartment 430 ignites a plasma and heats the gaseous propellant that generates thrust by expanding through the nozzle 432. A power system 470 (e.g., the power system 270 of FIG. 2) may supply energy to the microwave source 410, while a propellant system 490 (e.g., the propellant system 290) may supply the propellant to the propellant compartment 430. Thus, the MET thruster configuration 400 may operate within the spacecraft system 210.

Figure 5:
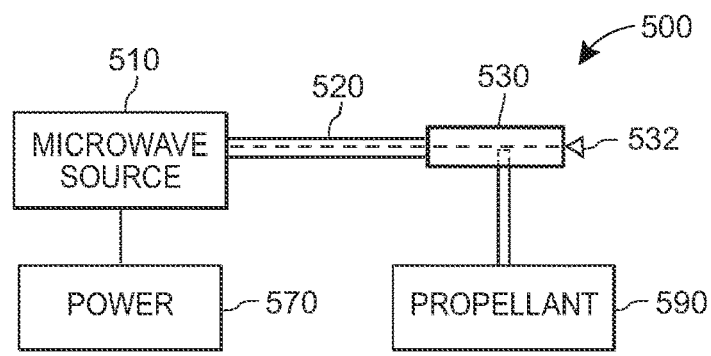
FIG. 5 is a block diagram of an example thruster system in which a propellant is injected into a coaxial transmission line.

FIG. 5 illustrates another MET thruster configuration 500. The microwave source 510 delivers energy via a coaxial transmission line 520 to a propellant compartment 530 disposed between a center conductor and a shield (an outer conductor) of a section of the coaxial transmission line 520. The microwave energy delivered to the propellant compartment 530 ignites a plasma and heats the gaseous propellant that generates thrust by expanding through the nozzle 532. A power system 570 (e.g., the power system 270 of FIG. 2) may supply energy to the microwave source 510, while a propellant system 590 (e.g., the propellant system 290) may supply the propellant to the propellant compartment 530. A section of the coaxial transmission line proximal to the nozzle 532 and including the propellant compartment 530 may form a resonance cavity. In some implementations, a section of the coaxial transmission line 520 may include an impedance transformation section with coaxial stubs, quarter-wave impedance transformer, or another suitable impedance matching circuit. The center conduct of the coaxial transmission line 520 within the propellant compartment 530 may be coated with a dielectric material to protect it from degradation caused by plasma. Further, the coaxial transmission line 520 can include a dielectric window to define the propellant compartment 530 (i.e., separate a one portion of the coaxial transmission line from another portion of the coaxial transmission line in which the hot gas is contained).

Figure 6A:
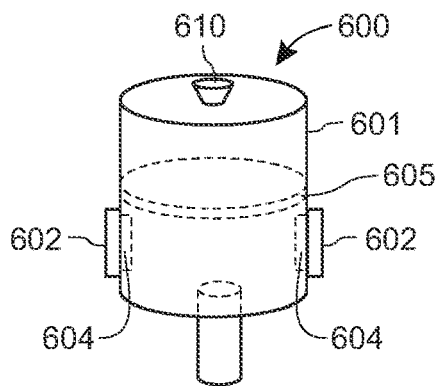
FIG. 6A schematically illustrates placement of magnets along the walls of the cylindrical housing of the resonant cavity to cooperate with one or more ferrite inserts disposed inside the resonant cavity and automatically tune the resonant cavity.

Now referring to a configuration 600 of FIG. 6A, a MET thruster of this disclosure in some implementations includes a resonant cavity 601 (which can be similar to the resonant cavity 281 discussed above and include a dielectric window 605 separating the cavity into two compartments), the resonant frequency of which a controller (e.g., the controller 240 of FIG. 2) can tune. In particular, to counteract the impact of the plasma generated within the resonant cavity 601 during operation of the MET thruster on the resonant frequencies of the resonant cavity 601, one or more magnets 602 exert a magnetic bias onto a ferrite insert 604 disposed inside the resonant cavity 601. In the example implementation of FIG. 6A, the one or more magnets 602 are electromagnets which the controller can activate and deactivate as needed.

For example, the controller 240 can activate the electromagnet(s) 602 when at least a portion of the propellant inside the resonant cavity 601 is ionized. As discussed in more detail with reference to FIG. 15 below, the propellant entering the resonant cavity 601 at an initial stage of operating the MET thruster can heat up and remain unionized until a certain time (and, at a time T3 in FIG. 15), when the propellant begins to form plasma and accordingly begin to impact the resonant frequencies of the resonant cavity 601. The controller 240 can determine this time using temperature sensors disposed in or near the resonant cavity 601 or, in another implementation, by determining the amount of time elapsed since the propellant began entering the resonant cavity at a certain flowrate and using a look-up table to determine when the controller 240 should activate the electromagnets 602.

In the implementation of FIG. 6A, the one or more magnets 602 are disposed along the vertical wall of the cylindrical housing of the resonant cavity 601 (with the position of a nozzle 610 defining the vertical orientation of the resonant cavity 601). The corresponding ferrite insert(s) 604 are disposed inside the resonant cavity 601, along the vertical wall of the cylindrical housing, so that the vertical wall of the resonant cavity 601 separates each of the one or more magnets 602 from the corresponding ferrite insert 604. A waveguide 620 couples microwave energy to the resonant cavity 601 at the base of the cylindrical housing of the resonant cavity 601.

Figure 6B:
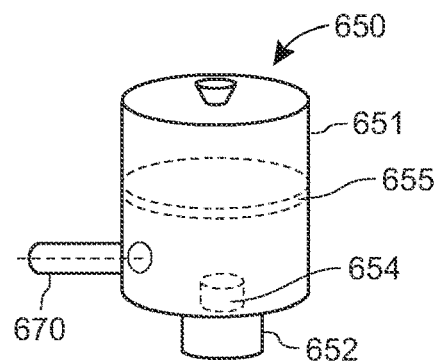
FIG. 6B schematically illustrates placement of magnets at the base of the cylindrical housing of the resonant cavity to cooperate with one or more ferrite inserts disposed inside the resonant cavity and automatically tune the resonant cavity.

On the other hand, in the configuration 650 of FIG. 6B, the one or more magnets 652 are disposed outside the base of the cylindrical housing of the resonant cavity 651 (which also can be similar to the resonant cavity 281 discussed above and can include a dielectric window 655), at an end opposite to the end at which the nozzle 660 is disposed. The ferrite insert 654 is disposed inside the resonant cavity 651 at the base of the cylindrical housing, so that the plate at the base of the resonant cavity 651 separates each of the one or more magnets 652 from the corresponding ferrite insert 654.

A waveguide 670 couples microwave energy to the resonant cavity 651 at a vertical wall of the cylindrical housing of the resonant cavity 651.

In some implementations, a MET thruster implements a combination of the techniques of FIGS. 6A and 6B. More generally, a MET thruster can include one or more ferrite inserts at any suitable locations within the resonant cavity and one or more magnets disposed at the suitable corresponding locations outside the resonant cavity. Moreover, in the some implementations the magnets can be permanent (e.g., rare earth magnets) mechanically actuated to interact with the ferrite inserts.

Next, several example techniques for coupling microwave energy to a propellant in a resonant cavity are discussed next with reference to FIGS. 7A and 7B.

Figure 7A:
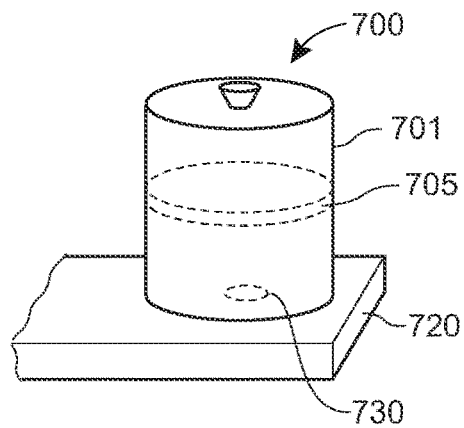
FIG. 7A illustrated an example coupling of microwave energy into a resonant cavity using a waveguide that abuts the base of the cylindrical housing of the resonant cavity.

Referring first to a configuration 700 of FIG. 7A, a resonant cavity 701 includes a dielectric window 705 and is disposed within a cylindrical housing, similar to the resonant cavity 281 discussed above. A waveguide 720 abuts the base of the cylindrical housing, at an end opposite to the end where a nozzle 710 is disposed. The waveguide 720 can have a rectangular cross-section for example. The waveguide 720 couples electromagnetic energy from a microwave source, such as the microwave source 288 of FIG. 2, into the resonant cavity 701 via an aperture 730. In this implementation, the aperture 730 has a round shape.

Figure 7B:
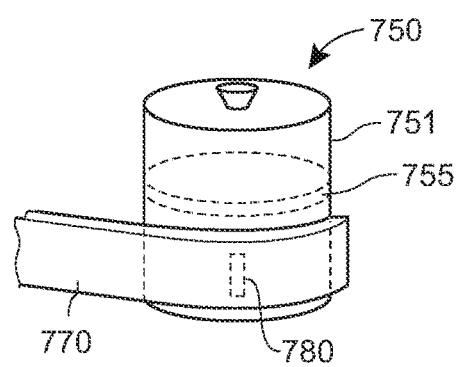
FIG. 7B illustrated an example coupling of microwave energy into a resonant cavity using a waveguide that abuts the wall of the cylindrical housing of the resonant cavity along at least a portion of the circumference of the cylindrical housing.

According to the configuration 750 of FIG. 7B, a resonant cavity 751 also includes a dielectric window 755 and is disposed within a cylindrical housing, similar to the resonant cavity 281 discussed above. However, a waveguide 770 wraps around at least a portion of the circumference of the cylindrical housing. The waveguide 770 thus abuts the vertical wall of the cylindrical housing. The waveguide 770 includes an aperture in the shape of a narrow slit, with the longer dimension of the slit parallel to the axis of the resonant cavity 751 (i.e., the axis of the cylindrical housing).

In some implementations, the waveguide 770 includes multiple apertures in the section that abuts the cylindrical housing of the resonant cavity 751, so as to increase coupling efficiency. For example, the waveguide 770 can include two, three, four, etc. apertures shaped similar to the aperture 780, via each of which the microwave source can deliver microwave energy into the resonant cavity 751.

In yet other implementations, a waveguide similar to the waveguide 720 or 770 can define a tangent to the circumference of the resonant cavity, and couple electromagnetic energy from a microwave source into the resonant cavity via a single aperture.

Figure 8A:
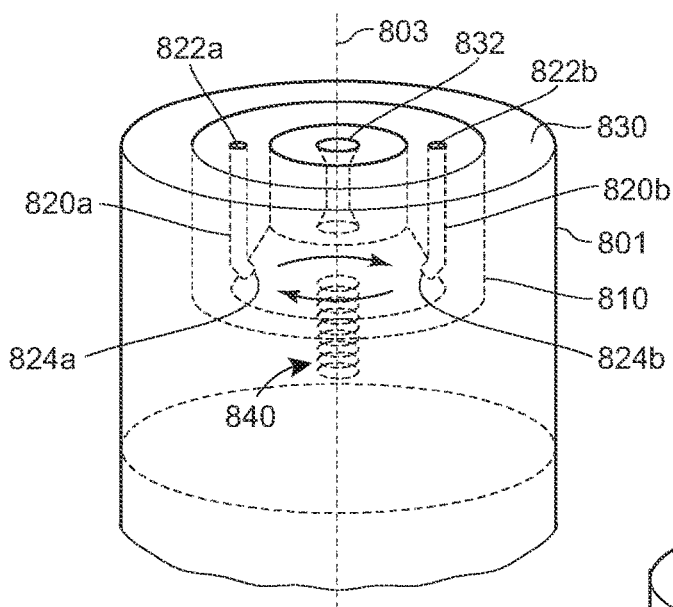
FIG. 8A is a perspective view of an example resonant cavity with an annular structure that extends into the resonant cavity along the thrust axis to support injectors of the propellant.

Now referring to FIG. 8A, an example resonant cavity 801 includes an annular structure 810 that extends into the resonant cavity 801 along the thrust axis 803 to support or include one or more injectors 820. In this implementation, two injectors 820A and 820B are separated from each other by 180 degrees along a circumference concentric with the circumference of the annular structure. In other implementation, the annular structure 810 supports four injectors, separated by each other by 60 degrees. More generally, the annular structure 810 can support N injectors, which can be separated from each other by 360/N degrees (or another suitable angular distance).

The annular structure 810 in this implementation does not extend above a top plate 830 which supports a nozzle 832. The annular structure 810 in other implementations can extend above the top plate 830. As a more particular example, the annular structure 810 can form an exit cone of the nozzle 832. In other implementations, the nozzle 832 has an integral structure, including an exit cone, and is provided separately of the annular structure 810.

In any case, the annular structure 810 can include channels extending from the respective inlets 822A and 822B into the cavity 801 to define injectors 820A and 820B, or the channel can receive hollow tubes of the injectors 820A and 820B. The injectors 820A and 820B are configured to create or improve a rotating circumferential flow of the hot gas in the cavity 801. To this end, the annular structure 810 can define a suitable geometry for the injectors 820A and 820B, e.g., curve the channels of the injectors 820A and 820B so that the propellant enters the cavity 801 at an angle relative to the thrust axis 803, or provide substantially straight channels at an angle to the thrust axis 803. In this manner, the injectors 820A and 820B impart angular momentum to the propellant entering the cavity 801, which in turns facilitates the creation of a rotating circumferential flow 840 of hot gas in the cavity 801. The annular structure 810 can orient the outlets 824A and 824B so that the injectors 824A and 824B impart angular momentum to the propellant along the same direction, e.g., clockwise as illustrated in FIG. 8A or counterclockwise.

Further, as illustrated in FIG. 8A, the annular structure 810 defines the location of outlets 824A and 824B of the injectors 820A and 820B, respectively. In particular, the annular structure 810 determines the respective locations of the outlets 824A and 824B in terms of a distance along the thrust axis 803 as well as in terms of a radial distance along a perpendicular to the thrust axis 803. The annular structure 810 thus can facilitate injection of the propellant close to the location within the cavity 801 where plasma is formed (rather than near the top plate 830 for example).

With continued reference to FIG. 8A, the annular structure 810 in an example implementation includes a section 850 with a radius that increases with the distance away from the nozzle 832. The section 850 thus is shaped as a conical frustum to further improve vorticity and facilitate the creation of a rotating circumferential flow of hot gas.

Figure 8B:
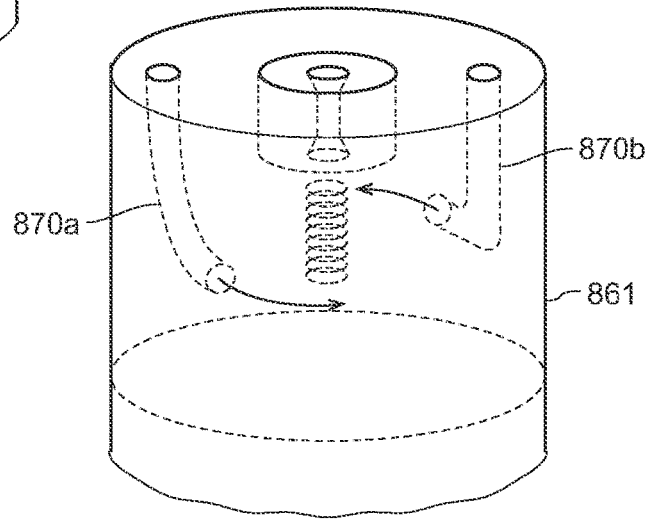
FIG. 8B is a perspective view of an example resonant cavity in which capillaries are used to deliver propellant into the resonant cavity.

FIG. 8B illustrates an example resonant cavity 861 in which the injectors 870A and 807B are implemented as capillaries. In this implementation, the capillaries are not supported by an annular structure, and the point at which propellant enters the resonant cavity 861 is defined by the shape and the material of the capillaries. Similar to the implementation of FIG. 8A, the injectors 870A and 807B can impart angular momentum to the propellant entering the cavity 861, which in turns facilitates the creation of a rotating circumferential flow of hot gas in the cavity 861.

Figure 8C:
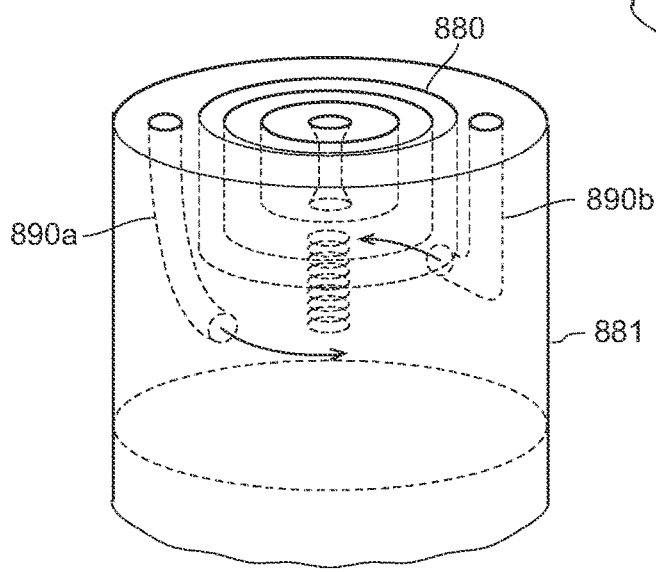
FIG. 8C is a perspective view of an example resonant cavity in which capillaries are used to deliver propellant into the resonant cavity, and an annular structure extends into the resonant cavity along the thrust axis to improve vorticity.

FIG. 8C illustrates an example resonant cavity 881 in which injectors 890A are 890B are implemented as capillaries disposed outside an annular structure 880 which, similar to the annular structure 810 of FIG. 8A, extends into the resonant cavity 881.

Figure 9A:
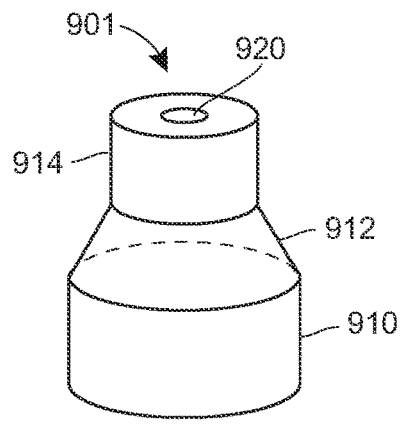
FIG. 9A illustrates an example geometry of a resonant cavity in which the varying diameter improves vorticity of the hot gas.
Figure 9B:
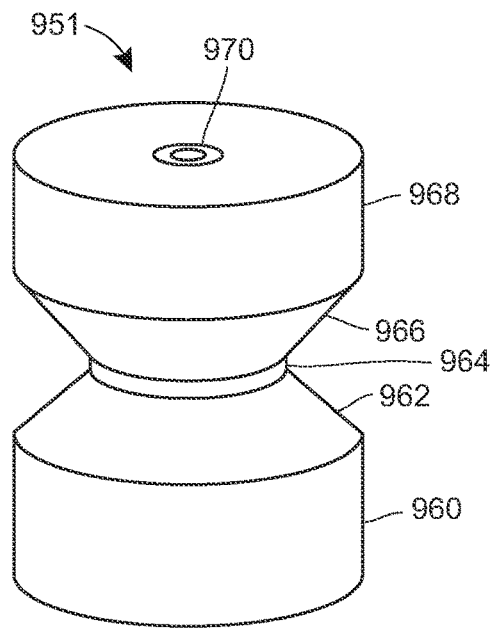
FIG. 9B illustrates another example geometry of a resonant cavity in which the diameter varying along two sections improves vorticity of the hot gas.

Next, FIGS. 9A and 9B illustrate several example geometries of a resonant cavity, which can be used as the resonant cavity 281 in the MET thruster of FIG. 2, for example. The resonant cavity 901 includes a bottom section 910, a middle section 912, and a top section 914 most proximate to a nozzle 920. In this implementation, the bottom section 910 and the top section 914 have a constant diameter, but the bottom section 910 has a wider diameter than the top section 914. The middle section 912 has a diameter that decreases along the cylinder axis, so that the portion of the middle section 912 closer to the nozzle 920 is narrower than the portion of the middle section 912 farther away from the nozzle 920. In this implementation, diameter decreases linearly, and the middle section 912 forms a conical frustum which can improve vorticity and facilitate the creation of a rotating circumferential flow of hot gas. More generally, the diameter need not vary linearly and can vary in any suitable manner (e.g., exponentially).

In the implementation of FIG. 9B, the resonant cavity 951 includes a bottom section 960, a first conical frustum section 962, a middle section 964, a second conical frustum section 964, and a top section 968 most proximate to a nozzle 970. The bottom section 960 and the top section 968 have the same constant diameter. The middle section 964 has a constant diameter smaller than the diameter of the bottom section 960 and the top section 968. The diameter of the first conical frustum section 962 decreases along the cylinder axis, so that the portion closer to the nozzle 970 is narrower than the portion farther away from the nozzle 970. The diameter of the second conical frustum section 966 increases along the cylinder axis, so that the portion closer to the nozzle 970 is wider than the portion farther away from the nozzle 970. The diameter can vary non-linearly in other implementations of the section 962 and/or the section 966. The geometry of the resonant cavity 951 also can improve vorticity and facilitate the creation of a rotating circumferential flow of hot gas.

Figure 10A:
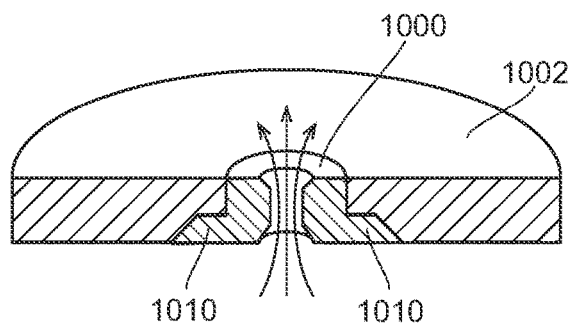
FIG. 10A illustrates an example monolithic nozzle disposed in a top plate of a resonant cavity.

Now referring to FIG. 10A, an example monolithic nozzle 1000 can be disposed in a top plate 1002 of a resonant cavity, such as the resonant cavity of 281 illustrated in FIG. 2. The entire nozzle 1000 can be made of the same material such as a ceramic, for example, or metal with ceramic coating. The nozzle 1000 can include a flange 1010 via which the nozzle 1000 attaches to the top plate 1002. The flange 1010 prevents the nozzle 1000 from being expelled due to pressure inside the resonant cavity.

Figure 10B:
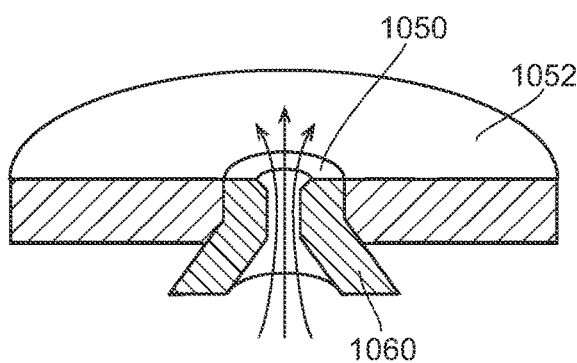
FIG. 10B illustrate an example configuration in which a nozzle insert extends into the cavity to increase the intensity of the electric field that acts upon the propellant.

In the implementation of FIG. 10B, an example monolithic nozzle 1050 similarly can be disposed in a top plate 1052 of a resonant cavity. The entire nozzle 1050 can be made of the same material. In this implementation, a portion 1060 of the nozzle 1060 extends into the resonant cavity to increase the intensity of the electric field that acts upon the propellant. The portion that extends into the cavity can prevents the nozzle 1060 from being expelled due to pressure inside the resonant cavity, similar to the flange 1010 of the nozzle 1000 discussed above.

Figure 11:
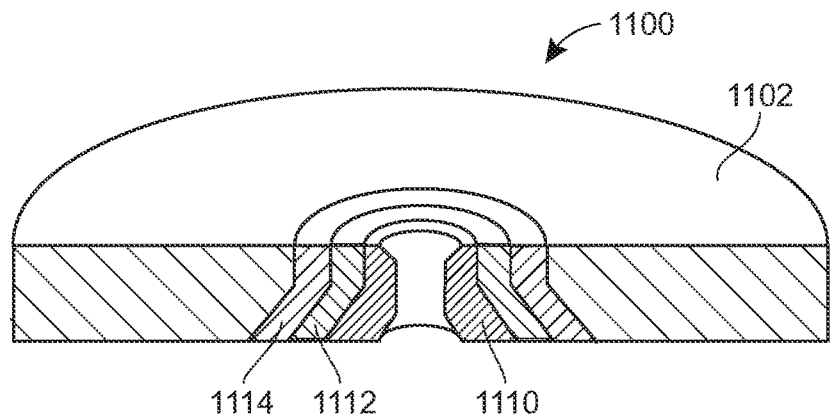
FIG. 11 illustrates an example configuration in which concentric annular inserts, made of materials with different coefficients of thermal expansion, reduce thermal stress exerted on the throat of the nozzle.

Next, FIG. 11 illustrates an example configuration 1100 in which concentric annular inserts 112 and 114 in a top plate 1102 surround a nozzle 1110. Although FIG. 11 illustrates two concentric annular inserts, in other implementations a single concentric annular insert is used or, conversely, more than two such inserts are used.

The top plate 1102 can be disposed at an end of a resonant cavity (e.g., the resonant cavity 281 discussed above). The top plate 1102 can be made of a certain material, such as steel or another suitable metal alloy or metal, with a first coefficient of thermal expansion (CTE) $\alpha 1$. The CTE of the material of the nozzle can be $\alpha 2$ different from $\alpha 1$. For example, the nozzle 1110 can be made of a ceramic material with a lower CTE than metal, or the nozzle 1110 can have a ceramic coating. Because the temperature may not distribute evenly through the top plate 1102 when plasma has formed in the resonant cavity, with areas closer to the nozzle 1110 heating up more than areas near the outer edge of the top plate 1102, the top plate 1102 may exert pressure on the nozzle 1110, which over time may lead to deterioration of the nozzle 1110. For example, the throat of the nozzle 1110 may get narrower or uneven.

In some implementations, the concentric annular insert 1112 is disposed between the nozzle 1110 and the top plate 1102 (directly adjacent to the top plate 1102 or adjacent via another one or more annular concentric inserts). The concentric annular insert 1112 has a coefficient of thermal expansion $\alpha 3$ different from $\alpha 2$ and $\alpha 1$. In an example implementation, $\alpha 3$ is smaller than $\alpha 2$ and $\alpha 1$. As a result, the concentric annular insert 1112 reduces the thermal stress which the top plate 1102 exerts on the nozzle 1110 and, in particular, on the throat of the nozzle. In another implementation, the CTE $\alpha 3$ is smaller than $\alpha 1$ but equal to or greater than $\alpha 3$. In yet another implementation, the concentric annular insert 1112 is made of an elastic material to absorb the stress exerted by the top plate 1102.

When multiple concentric annular inserts are used, the thermal coefficients of the concentric annular inserts can be selected so as to provide values between layers, e.g., the CTE $\alpha 4$ of the concentric annular insert 1114 can be between the CTEs $\alpha 3$ and $\alpha 1$ of the concentric annular insert 1112 and the top plate 1102, respectively.

Figure 12A:
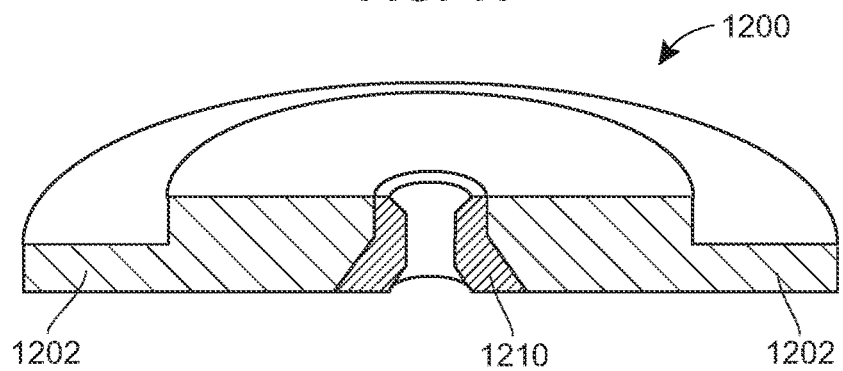
FIG. 12A illustrates an example nozzle adapter for simplifying the testing of various nozzles in a thruster system.
Figure 12B:
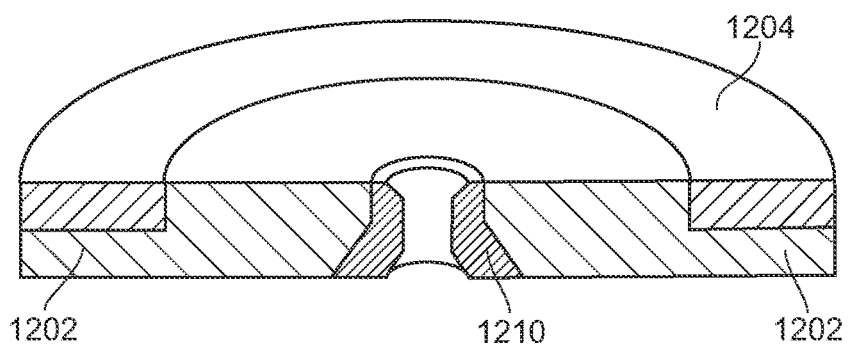
FIG. 12B illustrates the nozzle adapter of FIG. 12B mated with the top plate of a resonant cavity.

Now referring to FIGS. 12A and 12B, in some cases it is desirable to be able to test nozzles of different geometries and/or composition with a certain resonant cavity. A configuration 1200 illustrates an adapter 1200 configured to removably attach to a top plate 1204 (illustrated in FIG. 12B), which can be disposed at an end of a resonant cavity. For example, the adapter 1200 can include a flange 1202 that exerts a force on the top plate 1204 to prevent the adapter 1200 from being expelled by pressure within the resonant cavity. The adapter 1202 supports a nozzle 1210. In some situations, it may be easier to form an adapter similar to the adapter 1200 for a desired nozzle than adapt a nozzle directly to the top plate 1204.

Figure 13:
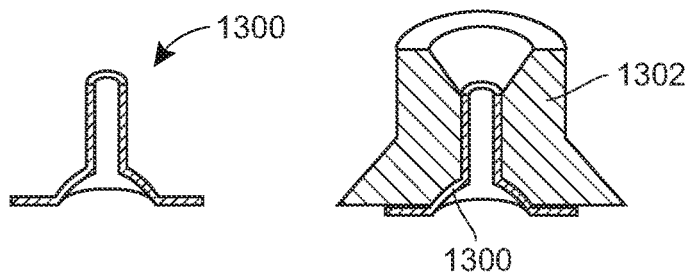
FIG. 13 illustrates an example nozzle insert which can be used to protect the throat of a nozzle.

Next, FIG. 13 illustrates an example nozzle insert 1300 which can be used to protect the throat of a nozzle 1302. The nozzle insert 1300 can be made of a refractory metal or another suitable material that can reduce the oxidation of the nozzle 1302. In one example implementation, the nozzle insert 1300 is made of iridium. In another example implementation, the nozzle insert 1300 is made of niobium. Although FIG. 13 illustrates a single-layer nozzle insert 1300, in general a suitable nozzle insert can be have any suitable number of layers (e.g., two, three, four).

Figure 14A:
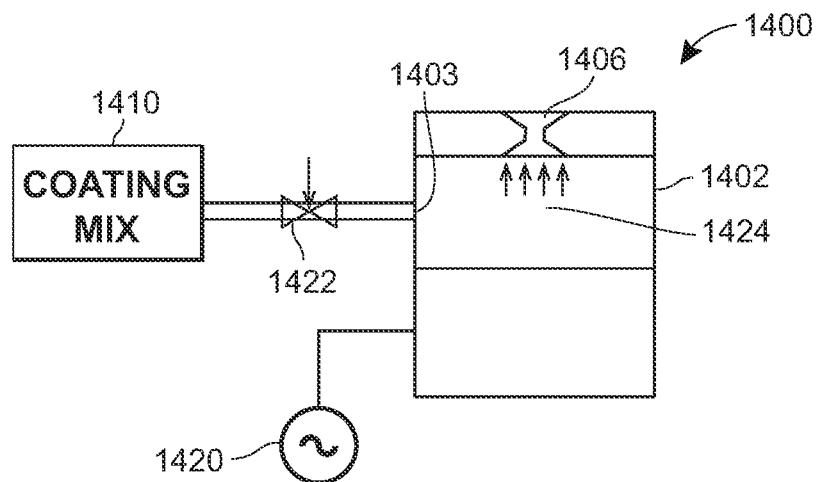
FIG. 14A is a block diagram of an example configuration in which a coating mix for depositing a coating material onto the inner surface of a nozzle can be injected into a resonant cavity during manufacturing.

FIG. 14A is a block diagram of an example configuration 1400 in which a coating mix 1410 for depositing a coating material onto the inner surface of a nozzle 1406 can be injected into a resonant cavity 1402 during manufacturing. In particular, during manufacturing of the nozzle 1406, a controller (which need not be associated with a spacecraft) can provide a control signal 1420 to a valve 1422 disposed in a fluid line between a pressurized tank with the coating mix 1410 and the resonant cavity 1402. The controller can cause the coating mix 1410 to be injected into the resonant cavity 1402 via an inlet 1403 when a microwave source 1420 (which can be similar to the microwave source 288 for example) can couple electromagnetic energy generated into the resonant cavity 1402. The energy produces hot gas 1422 from the coating mix 14010 in the resonant cavity 1402, and the pressure in the resonant cavity 1402 expels the hot gas 1424 via the nozzle 1406. When traveling through the throat of the nozzle 1406, the hot gas coats the throat (the interior surface) of the nozzle 1406 with a coating material.

The coating material in various implementations can be (or can include) oxide ceramics, non-oxide ceramics, or a refractory metal such as tungsten. Further, in some implementations the hot gas coats the throat of the nozzle with a diamond film or a sapphire film. To this end, the coating mix 210 includes a coating agent, so that the coating or film deposited onto the throat of the nozzle 1406 is a chemical product of the coating agent.

After undergoing the procedure schematically illustrated in FIG. 14A, the nozzle 1406 alone, or along with the resonant cavity 1402 can be deployed in a spacecraft. In some implementations, the resonant cavity 1402 receives a propellant via the same inlet 1403. Thus, a thruster installation including the resonant cavity 1402 and the nozzle 1406 can operate in a first mode in which the microwave energy produces hot gas to coat the nozzle 1406, and a second mode in which the microwave energy produces hot gas from the propellant to generate thrust, when the spacecraft is deployed in space.

Figure 14B:
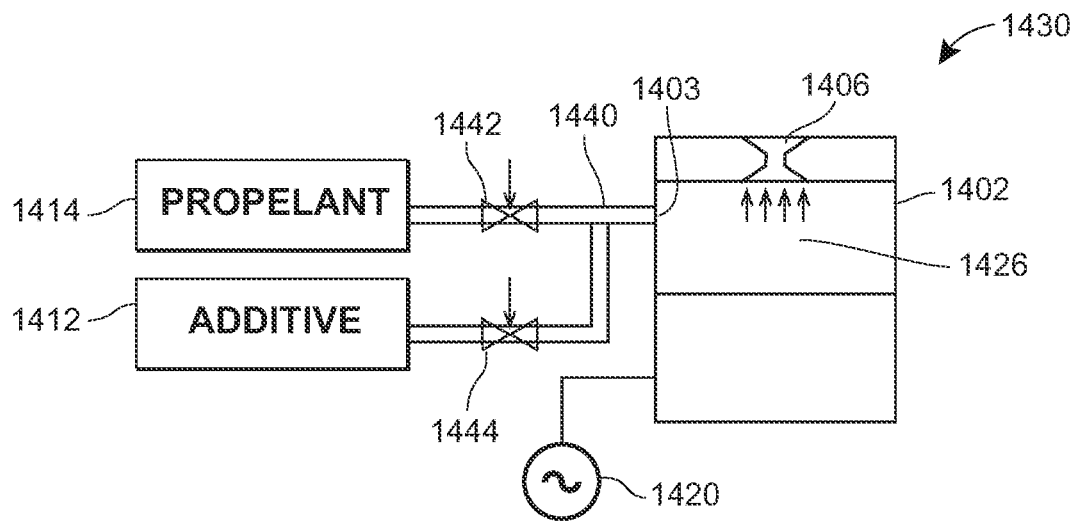
FIG. 14B is a block diagram of an example configuration in which a coating mix for depositing a coating material onto the inner surface of a nozzle can be injected into a resonant cavity in a certain operational mode of the thruster.

FIG. 14B is a block diagram of an example configuration 1430 in which an additive 1412 for depositing a coating material onto the inner surface of the nozzle 1406 can be injected into the resonant cavity 1402 in a certain operational mode of the thruster. In particular, the same or similar resonant cavity 1402 with the inlet 1403 can be coupled to a fluid line 1440 via which the controller of the spacecraft (e.g., the controller 240 of FIG. 2) can selectively cause only the propellant 1414 to be injected into the resonant cavity 1402, or a mixture of the propellant 1414 and an additive 1412. To this end, the controller can operate valves 1442 and 1444. Similar to the coating mix 1410 discussed above, the additive 1412 in various implementations can be (or can include) oxide ceramics, non-oxide ceramics, a refractory metal such as tungsten, a coating agent that forms a diamond film or a sapphire film, etc. In one operational mode the microwave energy from the microwave source 1420 produces hot gas 1426 from the propellant 1414 and the additive 1412, and the pressure in the resonant cavity 1402 expels the hot gas 1426 via the nozzle 1406, thereby coating the throat of the nozzle 1406 with a coating material included in the additive 1412. In another operational mode, the hot gas is generated from the propellant 1414 alone.

Figure 14C:
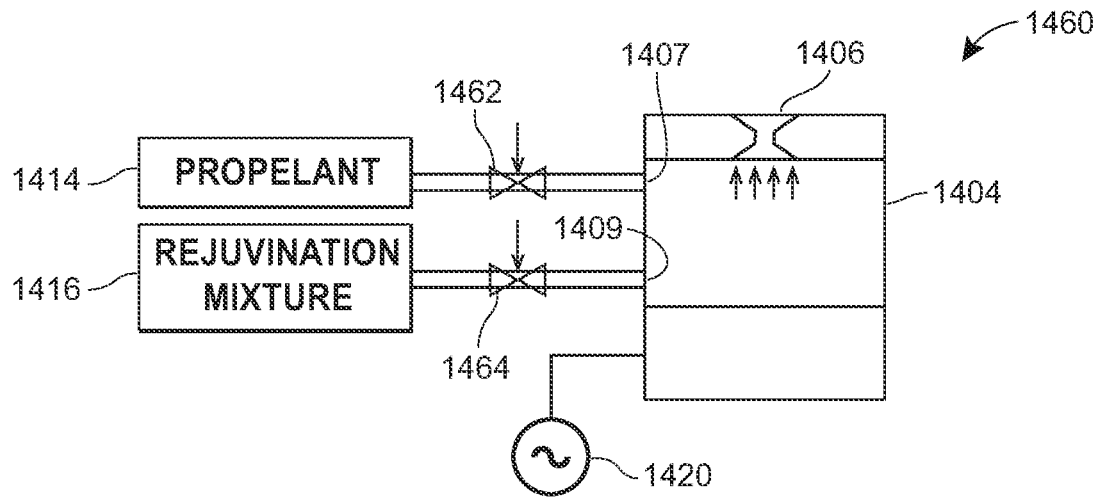
FIG. 14C is a block diagram of an example configuration in which a coating mix for depositing a coating material onto the inner surface of a nozzle can be injected into a resonant cavity along with the propellant.

FIG. 14C is a block diagram of yet another example configuration 1460 in which a coating mix for depositing a coating material onto the inner surface of a nozzle can be injected into a resonant cavity along with the propellant. A resonant cavity 1404 in this implementation includes two inlets 1407 and 1409 to receive a propellant 1414 or a "rejuvenation mixture" 1416, respectively. The rejuvenation mixture 1416 can be similar to the additive 1412, or include additional chemical agents suitable for protecting the nozzle 1406 from oxidation, erosion, etc. The controller can operate valves 1462 and 1462 to supply the propellant 1414, the rejuvenation mixture 1416, or both into the resonant cavity 1404.

Figure 15:
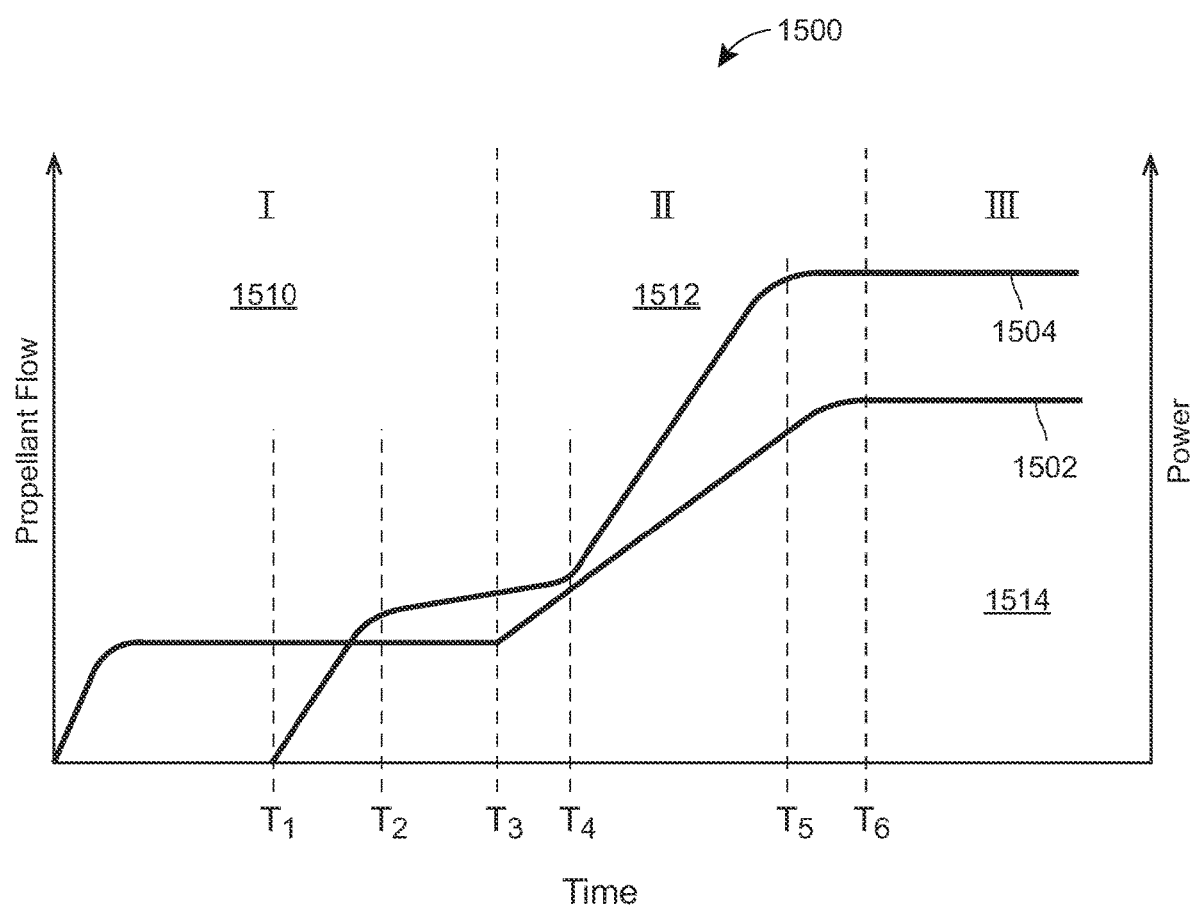
FIG. 15 illustrates power output of a microwave generator and a rate at which a propellant is injected into a cavity, plotted on a shared timeline, according to an example operation of a thruster system of this disclosure.

Finally, a diagram 1500 FIG. 15 depicts a curve 1504 representing power output of a microwave generator as well as a curve 1502 representing rate at which a propellant is injected into a resonant cavity, plotted on a shared timeline, according to which a MET thruster of this disclosure (e.g., the MET thruster system 280) can operate. Generally speaking, the diagram 1500 illustrates an ignition stage 1510, during which the thruster operates in an ignition mode, an intermediate stage 1512, during which the thruster ramps up the power and propellant flow, and a propulsion stage 1514, during which the thruster operates in a propulsion mode.

During the stage 1510, a controller of the thruster causes the propellant to start flowing into the resonant cavity at a first, relatively low and relatively constant, rate. As illustrated in FIG. 15, the controller operates the microwave source in the low-rate mode until time T3, at which the thruster transitions from stage 1510 to stage 1512. At time T1, subsequently to activating the flow of the propellant, the controller activates the power source and begins to supply the electromagnetic power to the resonant cavity. The controller ramps up the power until time T2 (subsequent to time T1 and prior to time T3).

At time T2, the controller determines (based on sensor inputs or using a look-up table, for example) that the propellant is approaching the state at which at least a portion of the propellant is ionized. The controller in this implementation starts increasing the power output more gradually until time T4. Then, at time T3, the controller determines that at least a portion of the propellant is ionized in the resonant cavity and begins to ramp up the flow rate. The controller can also ramp up the power, starting a later time T4.

The controller can stop ramping up the power and the flow rate at times T5 and T6, respectively. The controller then cause the thruster to operate in the propulsion mode, in which both the power and the flow rate are at a relatively high and relatively constant level. In some implementations, the controller further can vary the flow rate of the propellant at the propulsion stage 1514 in accordance with the desired thrust, i.e., the graph 1502 can "plateau" at different levels.

In microwave electro thermal (MET) rockets, propellant gas is heated to high temperature in a small volume by an electric discharge from an intensely focused microwave field. The high temperature gas is focused into the throat of a rocket nozzle where the hot gas is extracted and accelerated to high velocity thereby producing efficient thrust. The hot gas is focused by action of swirling the gaseous propellant in the region outside of the electric discharge. It is a general principle that centrifugal forces acting on a rotating column of gas will concentrate hotter and less dense gases along the axis of rotation while cooler and more dense gases will be pulled away from the axis of rotation. The present system and method describes the placement of gas flow injectors surrounding the rocket nozzle and discharge region.

These and other features and advantages of the present system and method will be apparent to those skilled in the art from the following detailed description, taken together with the accompanying drawings, in which like reference numerals refer to like parts.

Figure 16:
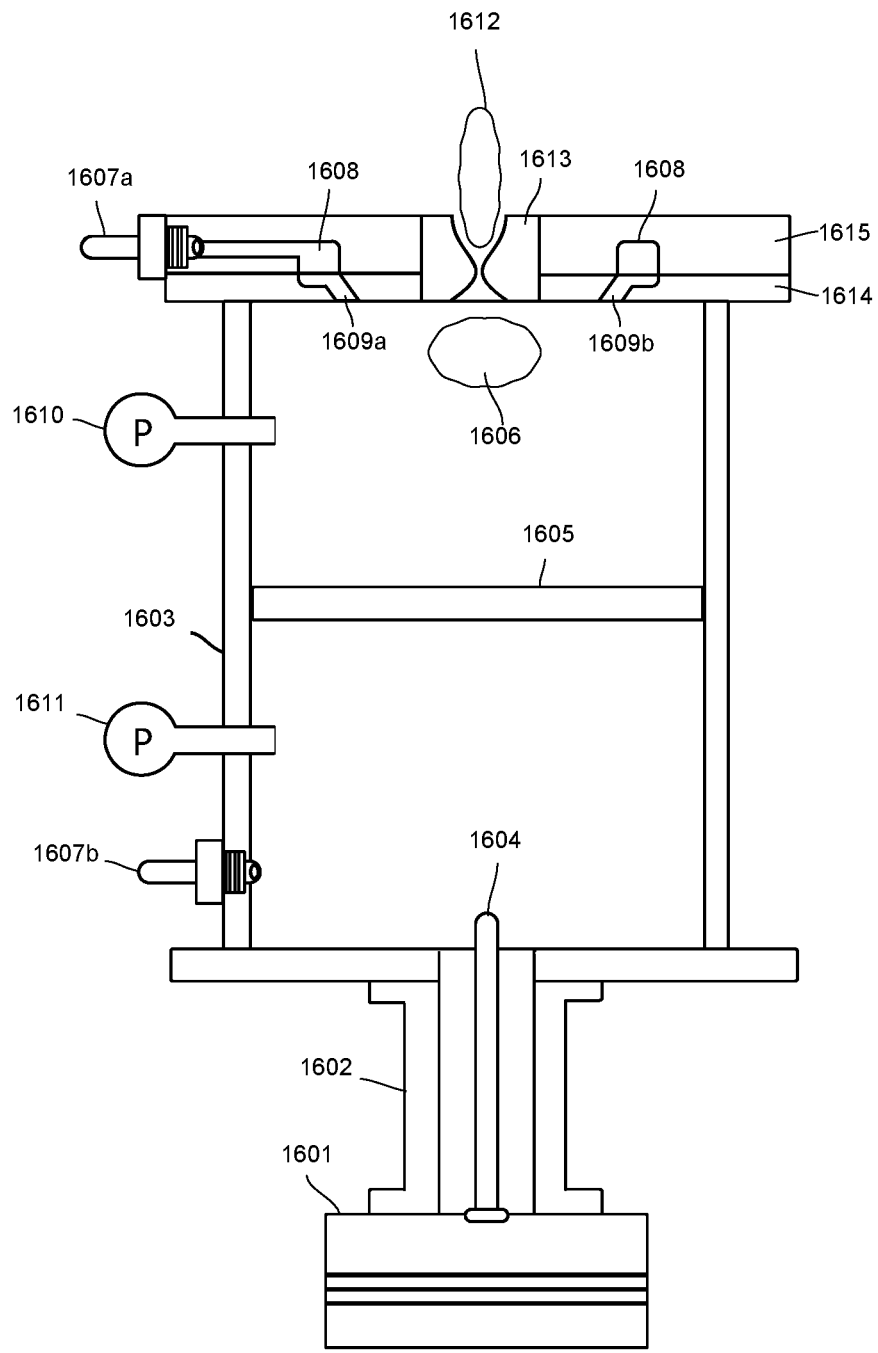
FIG. 16 illustrates a cross section view of an embodiment of a microwave electro-thermal (MET) rocket.

Referring to FIG. 16, a powerful source of microwave energy 1601, such as a magnetron, delivers microwave power through a coaxial transition structure 1602 to a hollow microwave resonator 1603. An antenna 1604 at the end of the coaxial structure 1602 causes microwave energy to radiate into the resonator 1603. The resonator 1603 is resonant at the frequency of the incoming microwave energy which causes an intense standing wave microwave field to fill the resonator.

A pressure-tight dielectric window 1605 divides the resonator 1603 into two compartments which may be independently pressurized. The dielectric window 1605 is substantially transparent to the microwave fields and does not disturb the standing wave pattern within the resonator 1603. Multiple gas feed connections 1607a and 1607b allow the two compartment halves to be separately pressurized with appropriate gasses. Pressures in the two compartment halves are independently monitored by pressure sensors 1610 and 1611.

Due to the intense microwave energy present near the end of the resonator, a localized electric discharge 1606 develops in the rotating propellant gas where it heats a small volume of the gas to high temperature. Gas pressure from continuous incoming gas forces the heated rotating gas flow into the throat of rocket nozzle 1613. The gas then exits through the rocket nozzle 1613 where it is accelerated to high speed 1612 producing rocket thrust. Rocket nozzle 1613 is further provided with means, such as a threaded connection, to permit it to be adjusted more or less protruding into the resonator 1603.

In this embodiment, the top endplate of the resonator 1603 is constructed in two parts in order to permit gas flow channels to be machined within the interior of the assembled top plate. The lower half of the top end plate, identified as part 1614, contains the gas injectors 1609a, b and the lower half of circumferential gas distribution channel 1608. The top half of the end plate, identified as part 1615, contains the gas feed connection 1607 and the gas flow channel and the upper half of circumferential gas distribution channel 1608. The gas injectors 1609a, b direct a propellant gas, such as water vapor, tangentially into the resonator 1603 to produce a rotating gas flow.

In this embodiment and method, the gas injectors 1609a, b may be placed at an optimal radial distance from the nozzle to best focus the electrical discharge 1606 toward the throat of nozzle 1613. In general, the optimal radial distance will depend on operational details of the rocket such as operating pressure, mass flow rate, and type of gas in use.

Figure 17:
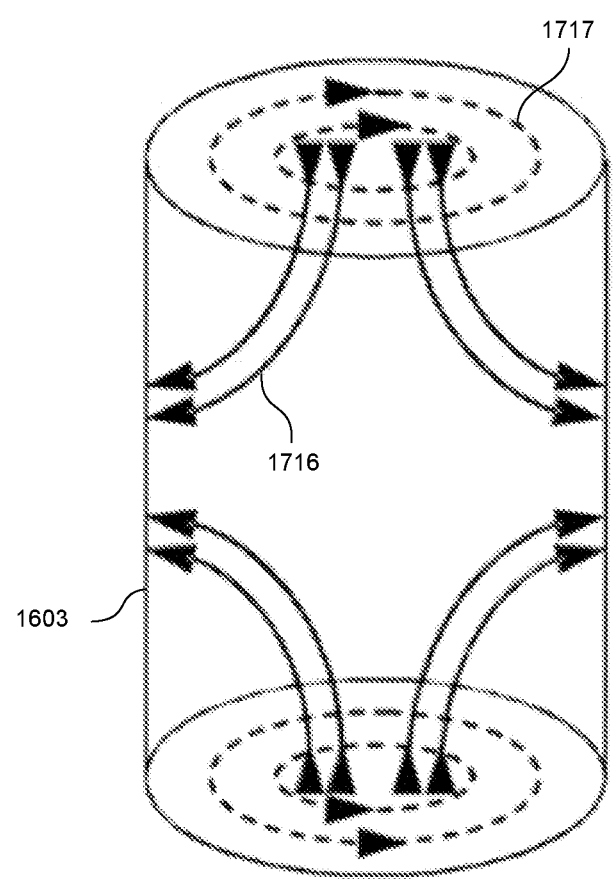
FIG. 17 is a perspective schematic view of the microwave fields inside the rocket.

Referring to FIG. 17, the standing wave fields inside resonator 1603 are indicated schematically. Electric fields 1716 are represented by curved solid curved arrows. Magnetic fields 1717 are represented by curved broken (dashed) arrows. The resonator 1603 is constructed in a size to support a TM011 standing wave mode. The resonator 1603 must be constructed in a size to match the wavelength of the microwave source 1601. This standing wave mode is chosen because it concentrates electric fields 1716 at the center of each end of the resonator. Highly intense concentrated electric fields provide the mechanism for producing a localized electric discharge 1606 in the propellant gas.

Figure 18:
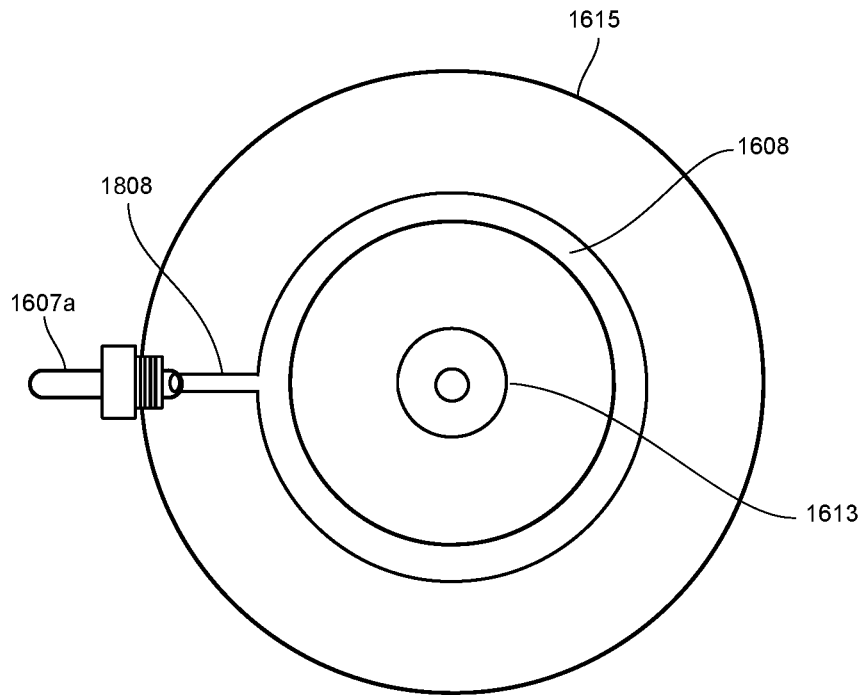
FIG. 18 illustrates details of the gas injectors in the first embodiment.

Referring to FIG. 18, the upper half of the top end plate, identified as part 1615, is shown in cross section. The propulsion gas enters the top plate through gas feed connection 1607a. Gas flows through gas flow channel 1808 and the upper half of circumferential gas distribution channel 1608. Part 1615 is able to direct gas to any number of gas injectors located in the lower half identified as part 1614 (in FIG. 19).

Figure 19:
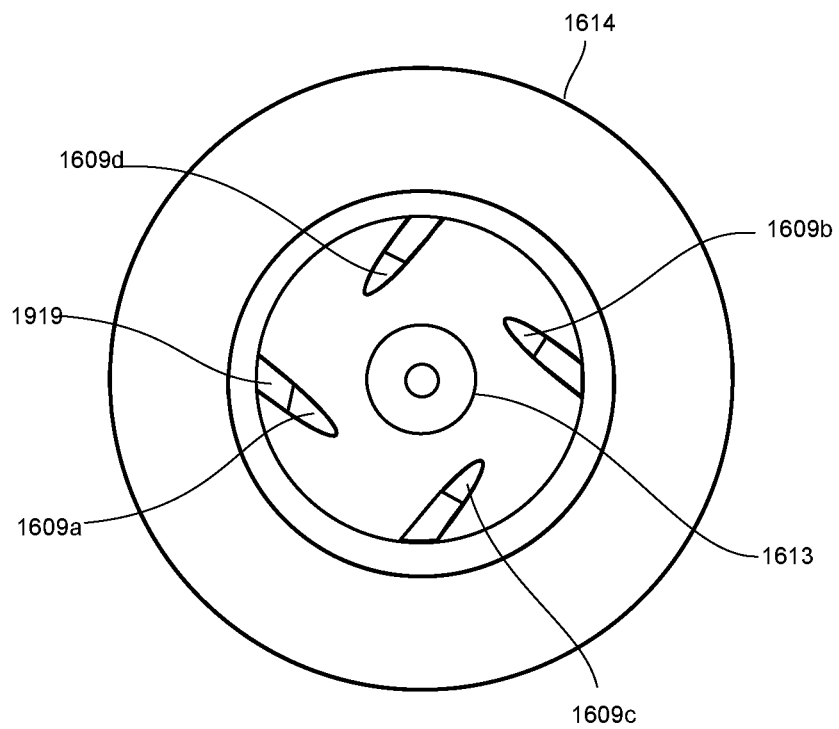
FIG. 19 illustrates additional details of the gas injectors in the first embodiment.

Referring to FIG. 19, the lower half of the top end plate, identified as part 1614, is shown in cross section. In this preferred embodiment, the swirl injectors 1609a-d are located close to the rocket nozzle 1613. The injectors 1609a-d connect to gas distribution channel 1608 through angled connector channels 1919. The connector channels 1919 and multiple gas injectors 1609a-c are angled in a circumferential direction to induce a rotating gas flow. They are further angled along the axial direction into the plane of part 1614 until they emerge at the lower surface of the top end plate 1615. In this manner, rotating gas may be injected close to the end plate of resonator 1603 and also close to the electrical discharge 1606.

The nozzle 1613, as discussed above, is typically made from a refractory material such as ceramic or tungsten metal. The view of the nozzle 1613 in this figure is looking through the throat from inside the resonator 1603.

Figure 20:
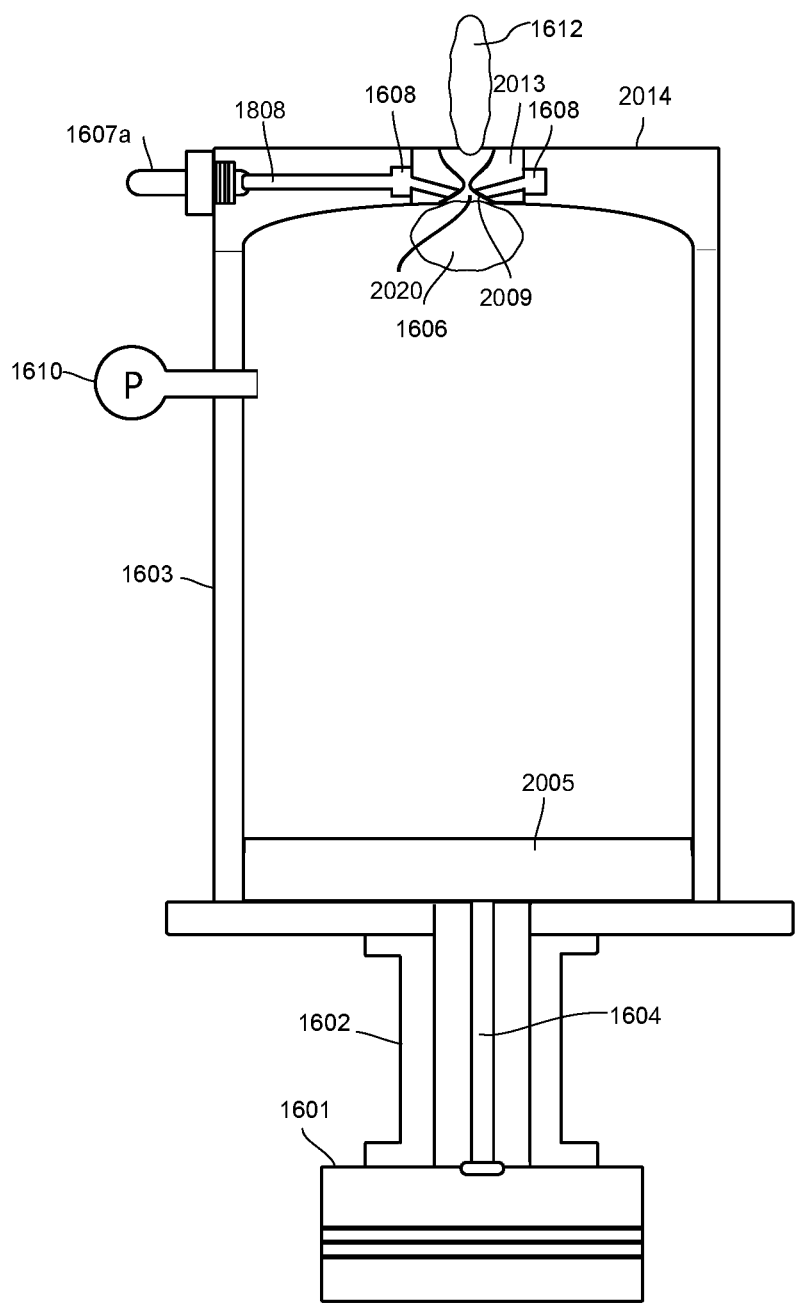
FIG. 20 illustrates a cross section of another embodiment of a MET rocket.

FIG. 20 shows a second embodiment of a MET rocket. In this embodiment, the pressure-tight dielectric window 2005 has been moved to the bottom of the resonator 1603, leaving a single pressurized compartment within the resonator 1603. At the upper end of resonator 1603, the top end plate is fabricated from a single plate 2014. In this embodiment, the gas injectors 2009 are positioned directly into the nozzle body 2013 in close proximity to the throat 2020 of the rocket nozzle.

Figure 21:
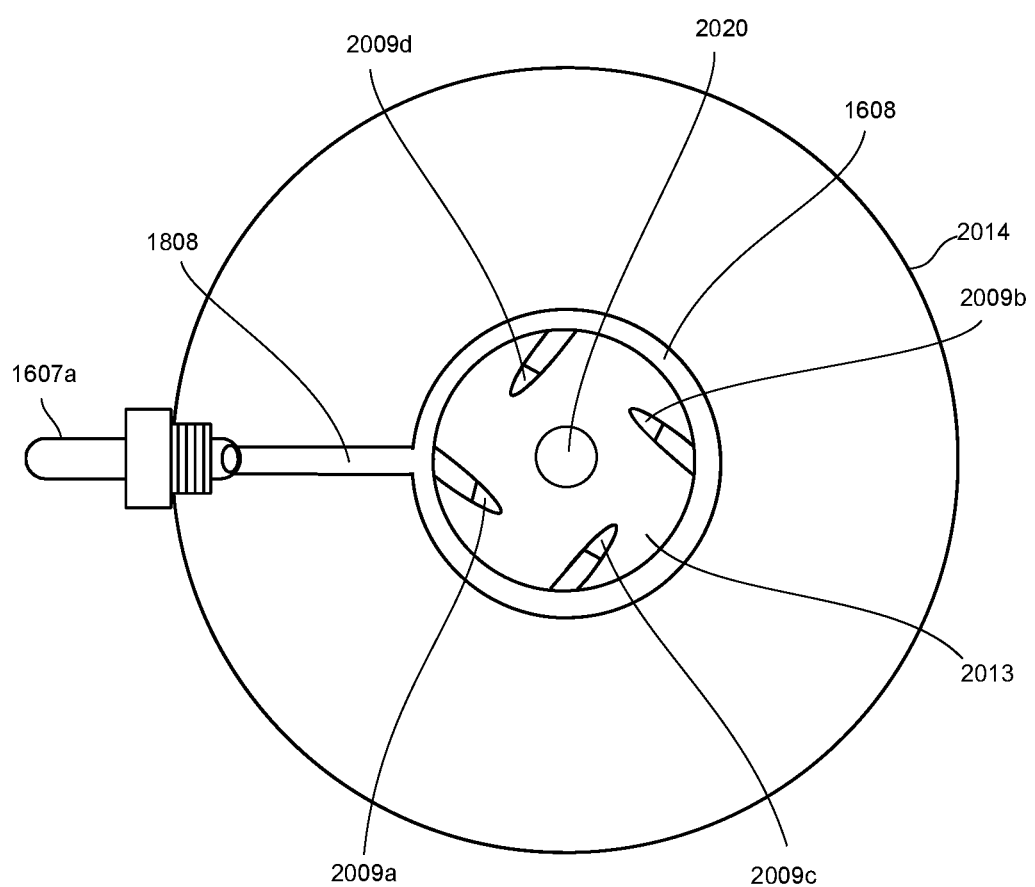
FIG. 21 illustrates details of the gas injectors in the embodiment of FIG. 20.

FIG. 21 is an end view of the second embodiment of FIG. 20. It shows details of the placement of gas injectors 2009a-d as they surround the nozzle throat 2020.

Rockets have been constructed with two key features: i) a pressure resistant chamber contains a hot propellant gas at high pressure, ii) the hot pressurized propellant gas then passes from the chamber into the throat of a rocket nozzle. A converging-diverging expansion nozzle serves to extract a flow of gas from the chamber and accelerate the flow to high velocity, thereby producing efficient thrust.

When hot gas is produced by combustion of fuel and oxidizer, the pressure resistant chamber is usually termed a combustion chamber, and the propellant gas consists of a mixture of gaseous combustion products. When propellant gas is heated by non-combustion means such as electrical heating, optical heating, or other directed energy heating means, then the pressure resistant chamber may be termed a propulsion chamber.

The usefulness of a rocket system is increased by efficient conversion of the input thermal energy, whether from chemical or electrical means, into produced thrust. It is preferred to minimize thermal energy losses by reducing thermal heat flow out of the propellant gas and through the walls of the propulsion chamber and the walls of the expansion nozzle. The heat loss problem is increased when rocket thrusters are reduced in size. Smaller thrust chambers have more surface area per total volume than larger chambers which leads directly to reduction in thermal efficiency.

Heat loss mitigation methods provide for the use of heat-resistant or refractory materials in the walls of the propulsion chamber and nozzle. Refractory materials allow the surfaces to operate at high temperatures, thus providing minimal cooling where they are in contact with hot gas contained by chamber or nozzle walls. The hot walls are then further insulated circumferentially along to contain the high surface temperatures and to minimize heat flow to other supporting structures through processes of conduction or radiation.

The present method and system provide heat containment without need for refractory materials in the propulsion chamber. They further provide for naturally cooler propulsion chamber walls without conducting substantial heat away from the contained hot gasses. They further provide for reduced heat loss through the nozzle walls, thereby improving thermal efficiency. They further provide for efficient focusing and containment of the hottest gasses into and through the central portion of the nozzle throat, thereby reducing nozzle erosion and extending operating lifetime.

The present method employs physical rotation of the entire propulsion chamber and nozzle, which we shall term the propulsion assembly. The axis of rotation is disposed to be collinear with the symmetry axis of the propulsion assembly and aligned along the centerline of the nozzle throat. In one embodiment, for a propulsion assembly of 5 cm diameter, a typical rotation speed may be 1800 rpm, which is the rotation speed of a motor for a small electric cooling fan. Many other sizes and rotation speeds are possible, as will become apparent to persons knowledgeable in the field.

Rotation of the propulsion assembly causes the contained hot gasses to also rotate due to friction with the chamber walls. After a time period of a few seconds needed to reach steady state conditions, the contained gasses match the rotation speed of the chamber walls. Thereafter, there is little appreciable shear motion between the chamber walls and the contained gas motions. In the rotating configuration, centrifugal forces act upon the contained gasses. Cooler heavier gasses are forced away from the rotation axis while lighter hotter gasses are forced toward the rotation axis. The cooler and hotter gasses are separated due to such buoyancy effects. For dimensions of the above-mentioned propulsion assembly, the acceleration forces operating on the gas at the chamber walls will exceed 90 times earth gravity.

In one preferred embodiment, the propulsion gas is water and heat is supplied by an electric arc. A portion of the propulsion assembly volume is occupied by liquid water. The remaining volume is occupied by gaseous water vapor. When rotating, a thick film of liquid water is held firmly and laminarly against the chamber walls without friction or shear forces between the liquid water and the chamber walls. The absence of relative motion between liquid water and chamber walls is preferred to reduce mechanical energy losses and to stabilize the inertial mass distribution of the liquid water thereby enhancing spacecraft controllability. The interior of the chamber is occupied by water vapor. A high voltage electric arc is discharged between two electrodes disposed within the chamber. The electrodes are separated by a few centimeters and aligned along the axis of rotation. The electric arc heats a small volume of water vapor to high temperatures. Buoyant forces cause the electric arc to be tightly focused along the rotation axis. When an electrically conducting rocket nozzle is substituted for one of the two electrodes, the high temperature water vapor arc is focused directly into the nozzle throat. At the same time, the temperature of the chamber walls can never exceed the temperature of boiling water.

The present method may be applied to both chemical and electric-powered rocket systems of various sizes, dimensions and proportions, and various propellant gasses; such as hydrazine, ammonia, argon, methane, propane, and carbon dioxide. These and other features and advantages of the present system will be apparent to those skilled in the art from the following detailed description, taken together with the accompanying drawings, in which like reference numerals refer to like parts.

Figure 22:
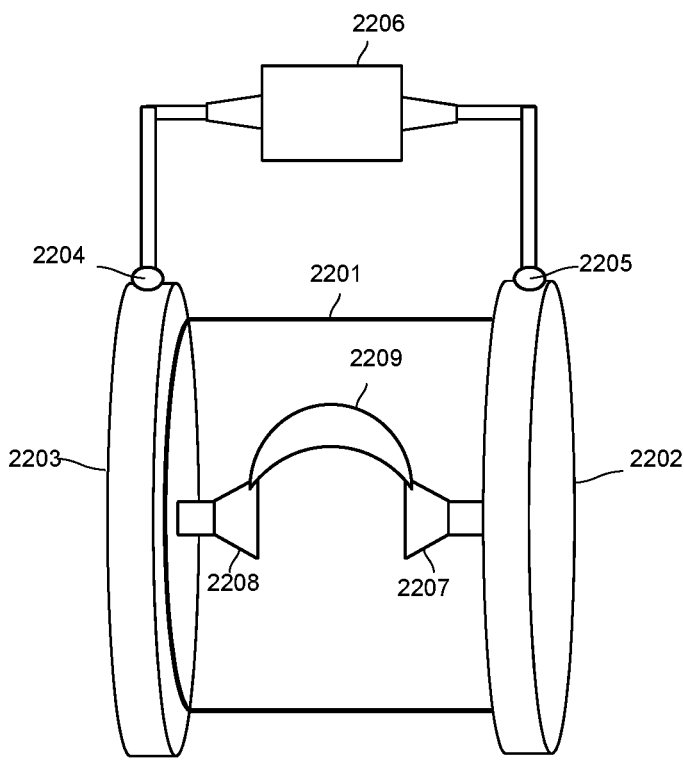
FIG. 22 is a schematic view of one embodiment of a chamber of a propulsion assembly.

FIG. 22 illustrates an example configuration of a portion of a propulsion system for heating propellant with an electric arc. A cylindrical chamber 2201 is closed at each end with metal end plates 2202 and 3. The chamber 2201 may be filled with gas (e.g., air at atmospheric pressure). Sliding electrical contacts 2204 and 2205 may provide electrical connections to a source of high voltage 2206. The end plates 2202 and 2203 may support conducting electrodes 2207 and 2208 respectively. The electrodes 2207 and 2208 may be positioned along the central axis of symmetry of the chamber 2201. The high voltage causes an electrical arc 2209 to strike between the electrodes 2207 and 2208. Due to buoyancy effects in gravity, the electrical arc 2209 may rise due to heating and have low stability, moving about when buffeted by air currents. An example source of high voltage 2206 may be configured to deliver up to 15 kV of 60 HZ alternating voltage at 450 watts into the electrical arc 2209.

Figure 23:
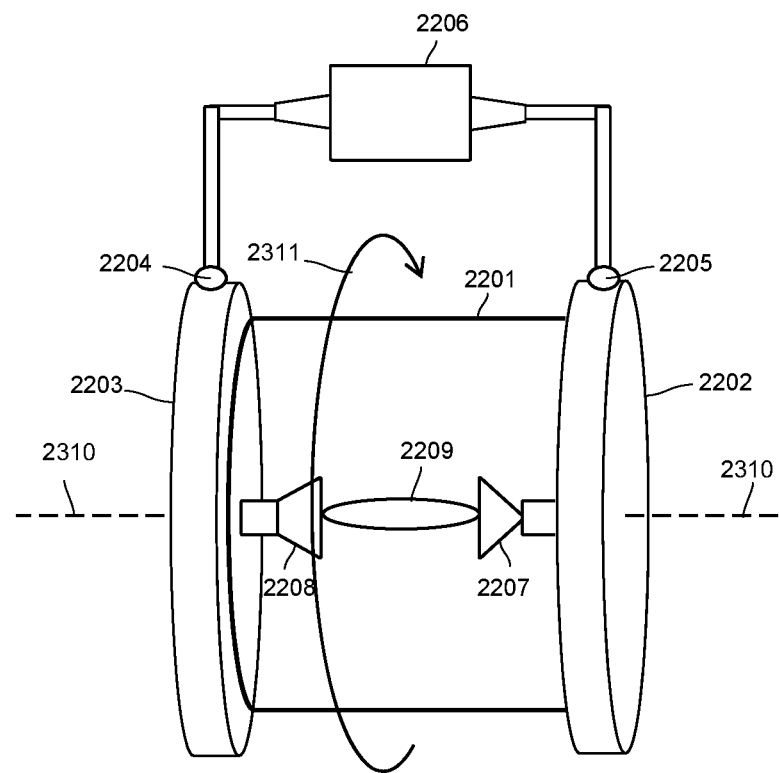
FIG. 23 is a schematic illustration of the assembly of FIG. 22 illustrating the rotational features of the system.

FIG. 23 illustrates the chamber 2201 together with end plates 2202 and 2203 set into rotational motion about a symmetry axis 2310, shown as a broken line. The direction of rotation is indicated by a curved arrow 2311. Moderate rotation rates can produce centrifugal accelerations within the chamber 2201 which substantially exceed the acceleration due to earth's gravity. Buoyancy effects may cause dense cooler air to be forced away from the rotation axis while warmer less dense air may be focused along the axis of rotation. The hot electric arc 2209 may, consequently, be tightly focused along the axis of rotation.

Figure 24:
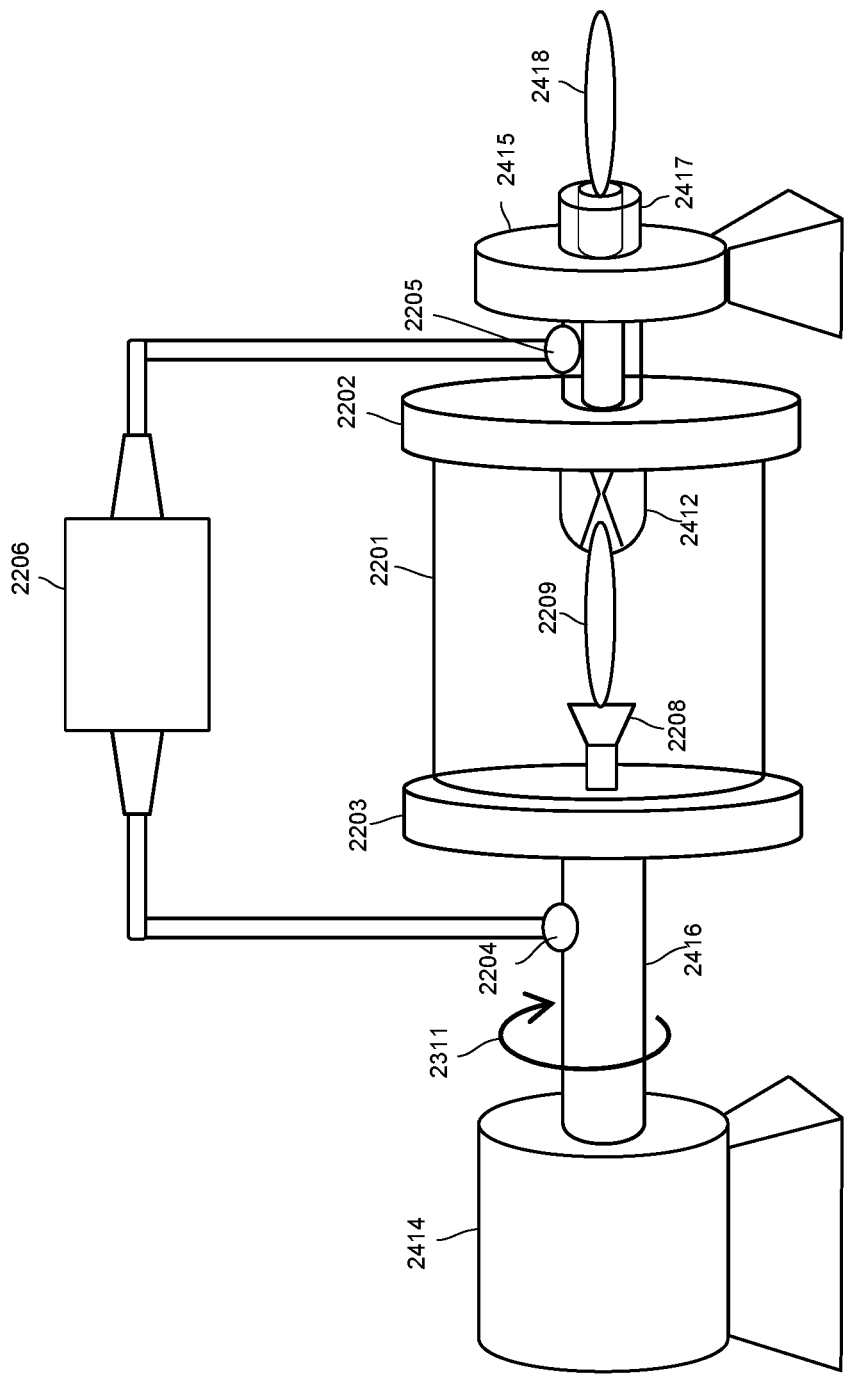
FIG. 24 is a schematic illustration of a rotational mounting of the propulsion assembly.

In FIG. 24, an example system configuration for rotating the chamber 2201 and adapting the chamber 2201 for propulsion are illustrated. Motor 2414 and shaft 2416 drive the rotational motion of the end plate 2203 and the chamber 2201. The electrical arc 2209 forms between the electrode 2208 and the input throat of a metal nozzle 2412. The end plate 2202 is supported by the hollow shaft 2417 and the support bearing 2415. The hollow shaft 2417 allows high velocity gas 2418 to exit the nozzle 2412 and produce thrust.

Figure 25:
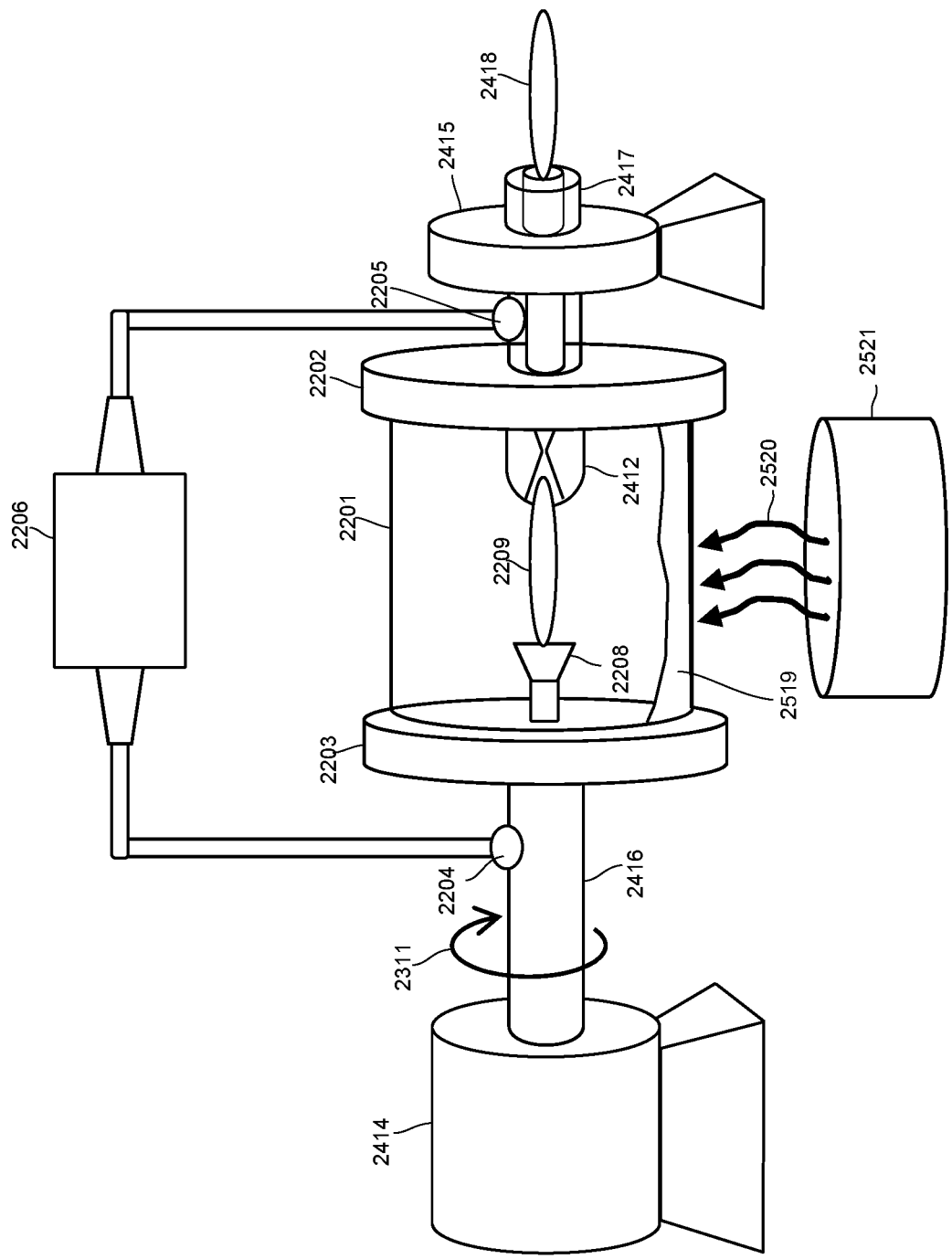
FIG. 25 is a schematic illustration of the assembly in which heat is added to the rotating chamber.

FIG. 25 illustrates an example system for adding heat to the rotating the chamber 2201 (e.g., at 1800 RPM) for the purpose of producing vapor propellant from a liquid. The chamber 2201 may be partially filled with water 2519. The outer wall of chamber 2201 receives heat 2520 from combustion (e.g., of a solid fuel) or any suitable heat source 2521. The addition of heat 2520 may cause the water 2519 to boil, and the water vapor may serve as the gaseous propellant. High voltage from the voltage source 2206 may cause the electrical arc 2209 to form between electrode 2208 and nozzle 2412. The electrical arc 2209 in water vapor may be tightly focused directly into the throat of nozzle 2412.

Figure 26:
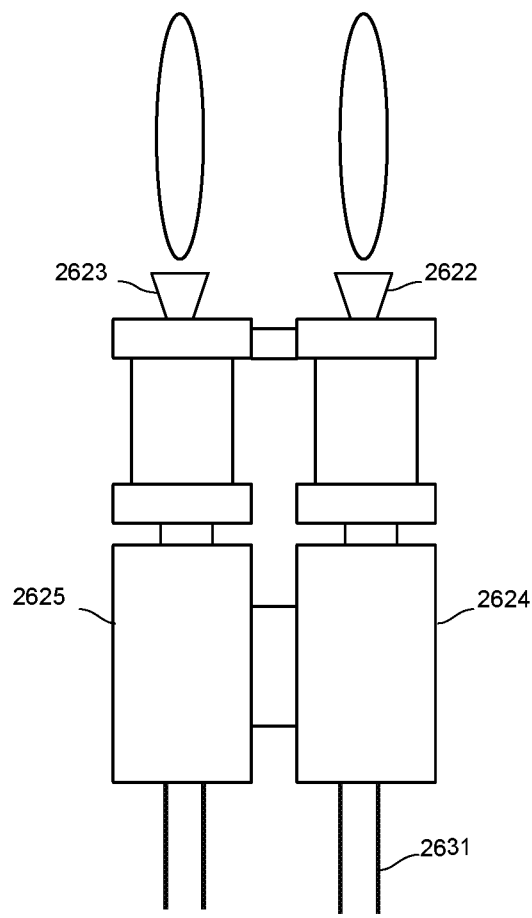
FIG. 26 is a schematic illustration of a dual counter-rotational assembly of thrusters as integrated into an example spacecraft.

FIG. 26 illustrates a configuration for employing rotating thrusters in a spacecraft. In space operations, it is advantageous to control the total vector-angular-momentum of a spacecraft to a value as close to net zero as possible. Any non-zero angular momentum may cause the spacecraft to rotate. In the illustrated embodiment, two similar rotating thrusters 2622 and 2623 are caused to rotate simultaneously at similar rate but in opposite directions by counter rotating electric motors 2624 and 2625. By counter rotating the thrusters, the angular momentum contribution from the thrusters may be controlled (e.g., set to substantially zero). Slight mass imbalances between the two thrusters may be precisely compensated by controlling the differential speed of the driving motors 2624 and 2625 through electrical drive cables 2631. Alternatively, the two thrusters 2622 and 2623 may be intentionally operated at different rotation speeds for short periods of time in order to intentionally rotate the spacecraft to a new orientation.

Figure 27:
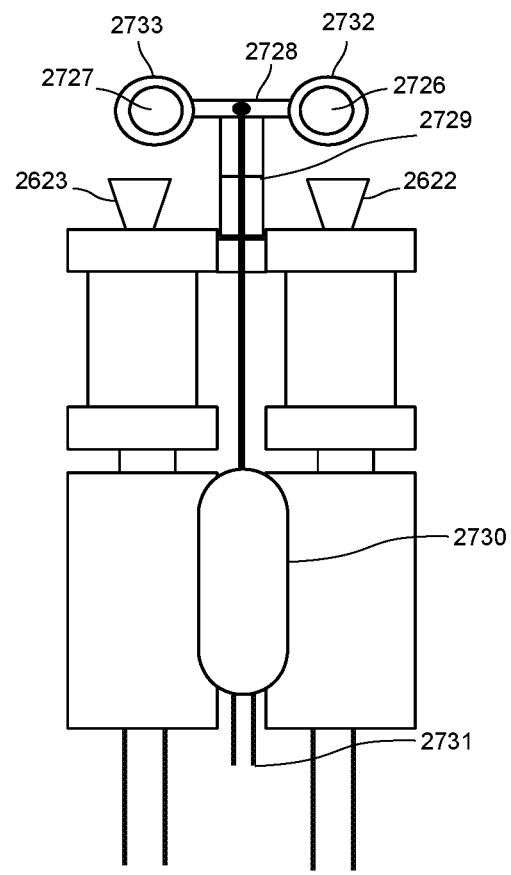
FIG. 27 illustrates additional details, of the assembly of FIG. 26.

Referring to FIG. 27, a system is illustrated for controlling water leakage from rotating thrusters. Counter rotating thrusters 2622 and 2623 are provided with articulated support structure 2728 and end caps 2726 and 2727. The end caps 2726 and 2727 are provided with compliant surface material which may be closed against the exhaust ports of the thrusters 2622 and 2623 to prevent water leakage. The end caps 2726 and 2727 may be opened or closed upon electrical command of the actuator 2730 through electrical drive cables 2731. The end caps 2726 and 2727 are further provided with bearings 2732 and 2733 which allow free rotation of the end caps 2726 and 2727 in the closed position. The two thrusters 2622 and 2623 may be operated at different rotation speeds with the end caps 2726 and 2727 in either open or closed position.

Figure 28:
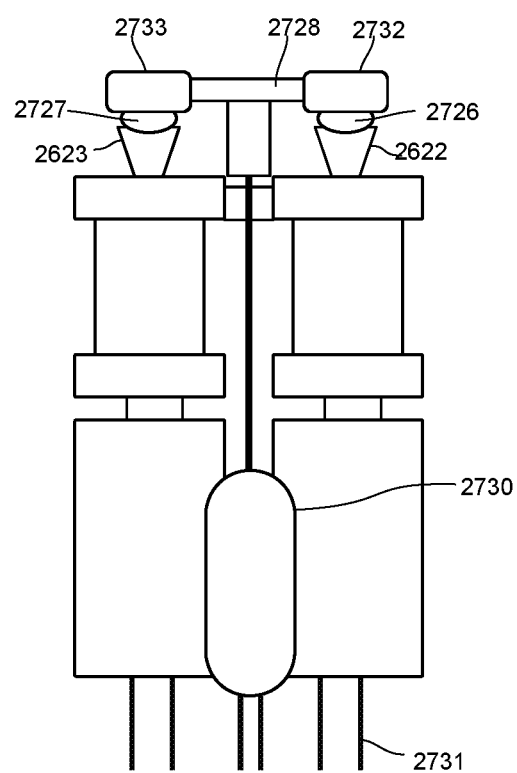
FIG. 28 illustrates further details of the assembly of FIG. 26.

FIG. 28 illustrates the system when the end caps 2726 and 2727 are in the closed position. Bearings 2732 and 2733 allow free rotation of thrusters 2622 and 2623 and the end caps 2726 and 2727 in the closed position.

Figure 29:
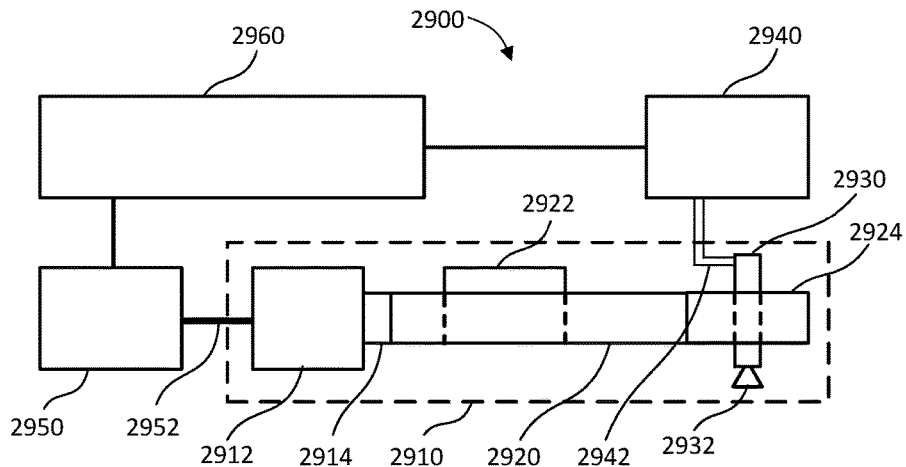
FIG. 29 is a block diagram of a propulsion system for a space vehicle with a thruster in which a propellant chamber pierces a microwave waveguide.

FIG. 29 is a block diagram of a propulsion system 2900 for a space vehicle. The propulsion or thruster system 2900 includes a thruster 2910, which may be referred to as a pierced-waveguide thruster 2910. The propulsion system 2900 may be an implementation of the thruster system 400 in FIG. 4. The thruster 2910 includes a microwave energy source 2912. The microwave energy source may be coupled to a waveguide 2920 via a coupler 2914. The waveguide 2920 may include multiple sections, e.g., a tuning section 2922 and a propellant heating section 2924 to transfer energy, or energize, a propellant. In some implementations, the thruster 2910 may include an isolator or a circulator to minimize reflected microwave energy returning back to the source 2912. Additionally or alternatively, the thruster 2910 may include one or more filters and/or amplifiers to condition the microwave power generated by the source 2912.

Generally, the microwave energy source 2920 may include one or more magnetrons and/or solid state oscillators, combiners and/or amplifiers. The source 2920 may generate narrow band electromagnetic radiation with a frequency of 100 s of megahertz (MHz) to 10 s of gigahertz (GHz).

In some implementations, the waveguide 2920 may be a rectangular waveguide. In other implementations, the waveguide 2920 may be a cylindrical waveguide or have another suitable cross-section shape. Furthermore, the shape and/or size of the waveguide cross-section may vary along the length of the waveguide 2920. The direction of propagation of the waveguide may be defined along the length dimension leading away from the source 2912. In some implementations, a standing wave may form within the waveguide 2920 along the direction of propagation due to reflections. Waveguide modes, on the other hand, depend on the transverse dimensions of the waveguide 2920. The energy source 2912, the coupler 2914, and the waveguide 2920 may be configured to excite certain modes of the waveguide 2920, as described below. In particular, the energy source 2912 may operate at or near 433 MHz, 915 MHz, 2450 MHz, or 5800 MHz.

A propellant chamber 2930 pierces the microwave waveguide 2920 at the propellant heating section 2924. The propellant chamber 2930 may be referred to as the primary propellant chamber 2930. The propellant chamber 2930 may have a nozzle 2932 serving as an egress port for the heated propellant. In some implementations, any opening of the chamber 2930 (e.g., an open tube) may serve as the egress port.

A propellant management system 2940, including at least one propellant tank and a propellant injection mechanism, may use the injection mechanism to supply propellant to an ingress port of the propellant chamber via a fluidic connection 2942. The injection mechanism may include one or more pumps, plungers, actuated membranes, heaters, coolers, valves, capillary structures, nozzles, etc. to transport propellant from the tank of the propellant management system 2940 to the propellant chamber 2930. The propulsion system 2900 may inject the propellant into the propulsion chamber 2930 as a gas, a liquid aerosol or any other suitable form.

The microwave energy source 2952 be electrically connected to a power source 2950 via a power connection 2952. The power source 2950 may include one or more batteries, thermal capacitors, and/or other suitable energy storage components. Additionally or alternatively, the power source 2950 may include one or more energy conversion devices, i.e. generators, fuel cells, etc. to generate electrical energy from thermal and/or chemical sources. Furthermore, the power source 2950 may include one or more circuits to switch, vary, and/or condition the power supplied to the microwave source 2912.

A controller 2960 may be in communicative connection with the propellant managements system 2940 and with the power source 2950. The controller 2960 may be configured to cause the propellant injection mechanism of the propellant management system 2940 to inject or change an injection rate of the propellant into the primary propellant chamber 2930. Additionally, the controller 2960 may be configured to supply energy to the propellant in the primary propellant chamber 2930 via the waveguide 2930 to thereby heat the propellant and cause the heated propellant to exit the primary propellant chamber 2930 via the egress port (e.g., nozzle 2932). The controller 2960 may also be configured to change the power and/or frequency for the microwave source 2950.

Figure 30:
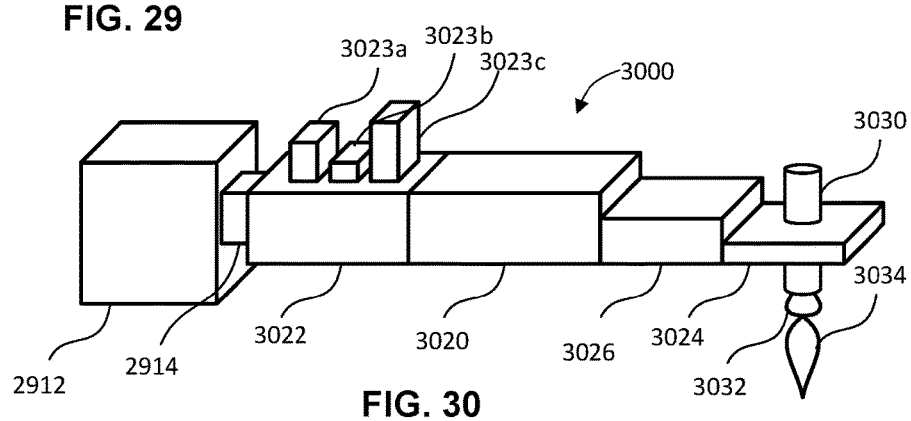
FIG. 30 is a perspective view of a thruster of the propulsion system in FIG. 29.

FIG. 30 is a perspective drawing of an example implementation of the thruster 2910 of the propulsion system in FIG. 29. An example waveguide 3020 (which may be the waveguide 2920) is a rectangular waveguide. In other implementations, the waveguide 2920 may have a different cross-section, as described above.

The walls of the waveguide 3020 may be constructed out of metal (e.g., steel, aluminum, copper, etc.), metal alloys, or another suitable conductive material. The waveguide 3020 may operate in a fundamental transverse electric (TE) mode, a fundamental transverse magnetic (TM) mode, a higher order mode, or a mixture of guided modes. In other words, the microwave source 2912 may excite one or more of the above modes of the waveguide 3020. Still in some implementations, evanescent modes of at least some sections of the waveguide 3020 may be excited. In some implementations, the waveguide 3020 may be filled with vacuum (i.e., the ambient space environment). In other implementations, the waveguide 3020 may be filled with dielectric, which may allow for smaller waveguide dimensions supporting propagating modes. Although the waveguide 3020 is straight, folding a waveguide (e.g., waveguides 2920, 3020) may lead to a more compact implementation of the thruster 2910. For example, the waveguide 3020 may be folded with two 90° bends to reverse the direction of propagation (with respect to the outside frame of reference), leading to around a two-fold reduction of the longest dimension of the thruster 2910. More folds may be used to trade-off an extent of the thruster 2910 along one dimension with respect to another.

The waveguide 3020 has a tuning section 3022 which may be an implementation of the tuning section 2922. The tuning section 3022 may include three tunable stubs 3023a-c with variable effective lengths which may be tuned to impedance match the waveguide load to the source 2912. Generally, the tuning section 3022 may include a screw, shorting plate, stub, or other physical device which moves inside the waveguide. As discussed below with reference to FIG. 39, the controller 2960 may be configured to adjust the tuning section 3022 based on sensor data.

A propellant heating section 3024 of the waveguide 3020 may implement the heating section 2924 with a waveguide section which has a reduced dimension. The reduced dimension may result in a more concentrated electric field for heating the propellant, as discussed in more detail below. The heating section 3024 need not support a propagating mode and use an evanescent mode to deliver energy to the propellant. The waveguide 3020 of the thruster 2912 may include an intermediate section 3026 to impedance match or mode match to the propellant heating section 3024.

A propellant chamber 3030 may be an implementation of the primary propellant chamber 2930. The propellant management system 2940 and the fluidic connection 2942 to the ingress port of the chamber 3030 are not shown in FIG. 30. The propellant chamber 3030 is cylindrical. In other implementations, the propellant chamber may include paraboloid and/or conical sections, or any other suitable shapes, particularly with rotational symmetry. The walls of the propellant chamber 3030 may be made of a dielectric material (e.g., quartz, ceramic, etc.) to minimize interference with the electric fields in the waveguide 3020 and prevent a significant reduction in the electric field magnitude within the chamber 3030. The diameter of the chamber 3030 may be a suitably small fraction (e.g., 0.05, 0.1, 0.15, 0.2) of the wavelength to substantially minimize the effect of the chamber 3030 and the associated openings in the pierced waveguide 3020 on the field in the waveguide 3020.

The propellant chamber 3030 includes a nozzle 3032 (implementation of the nozzle 2932) as an egress port. In some implementations, the nozzle 3032 may be made of the same material as the propellant chamber 3030. For example, the propellant chamber 3030 and the nozzle 3032 may be a monolithic component of blown glass. In other implementations, the nozzle 3032 may be made of a different material from the chamber 3030 and may be fixedly or removably attached to the chamber 3030 using a braze, an O-ring, or another joining method. For example, the nozzle 3030 may be made of metal, ceramic, or another suitable material. The nozzle 3030 may be made of a refractory material to minimize deterioration at high temperatures.

In operation, the microwave source 2912 may deliver power (e.g., 50, 100, 200, 500, 1000, 2000, 5000 watts) to the propellant in the propellant chamber 3030. The delivered power may partially ionize the propellant and the expanding propellant plasma may exit the nozzle 3032 forming a plume 3034 and generating thrust.

FIGS. 3A-C illustrate three example configurations for injecting propellant into the primary propellant chambers 3130a-c which are examples of the propellant chamber 3030 of the thruster in FIG. 30. The fluidic connection 2942 enters ingress ports 3131a-c of the respective chambers 3130a-c at different locations with respect to respective nozzles 3132a-c. It may be beneficial to configure the ingress ports 3131a-c to create circumferential flow within the respective chambers 3130a-c to confine ionized propellant, as described in more detail below.

Figures 31A, 31B, 31C:
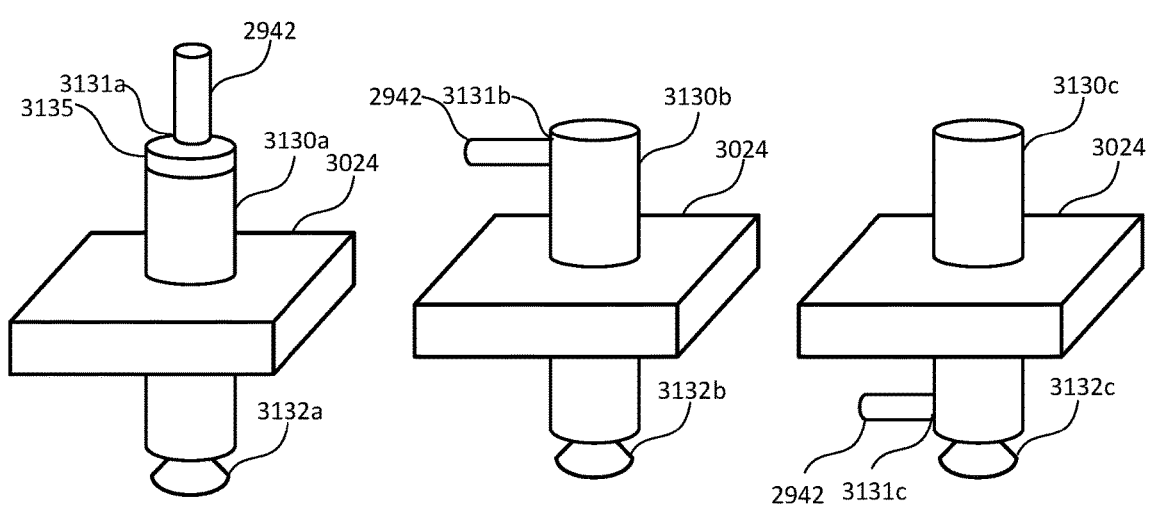
FIGS. 31A-C illustrate three example configurations for injecting propellant into a propellant chamber of the thruster in FIG. 31.

In FIG. 31A, the fluidic connection 2942 enters the ingress port 3131a axially from the top, at the opposite end of the nozzle 3132a of the chamber 3130a. The ingress port 3131a may fluidically connect to a flow distribution adapter 3135. The flow distribution adapter 3135 may be configured to direct propellant to create circumferential flow in the chamber 3130a. In some implementations, the flow distribution adapter 3135 may be monolithic with the chamber 3132a. For example, the chamber 3130a and the adapter 3135 may be fabricated together using a suitable additive manufacturing technique. In other implementations, the adapter 3135 may be fixedly or removably attached to the rest of the chamber 3130a. The attached adapter 3135 may be made of a different material (e.g., metal, ceramic, etc.) from the rest of the chamber 3130a.

In FIG. 31B, the fluidic connection 2942 may enter the ingress port 3131b tangentially to the inside of the chamber 3130b at the end opposite to the nozzle 3132b. Such configuration may create circumferential propellant flow with the high pressure region at the end opposite to that of the nozzle 3132b. In contrast, the fluidic connection 2942 in FIG. 31C may enter the ingress port 3131c tangentially to the inside of the chamber 3130c at the same end as the nozzle 3132c. The resulting circumferential from may create a pressure well near the nozzle 3132c, as illustrated in more detail in FIGS. 32A, B.

High electric fields from the microwave source 2912 may break down propellant to generate plasma, which, due to increased conductivity, absorbs more electromagnetic energy. For efficient thruster operation, it may be beneficial to confine and stabilize plasma near a nozzle.

Figure 32A:
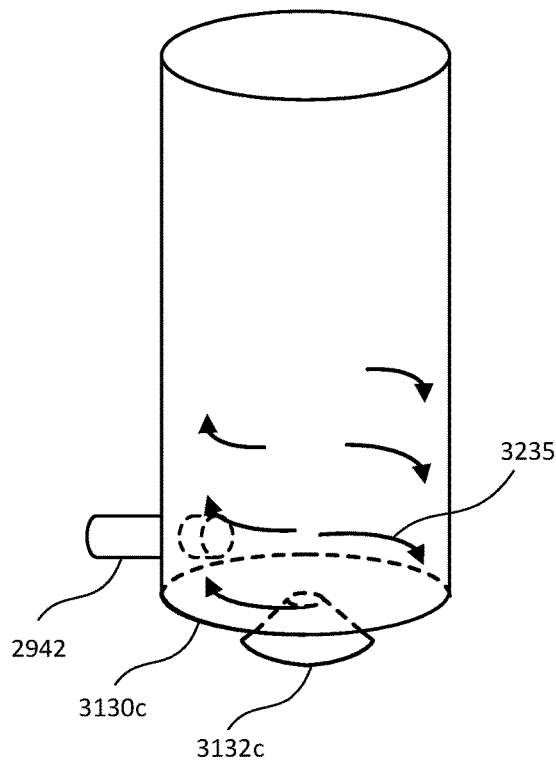
FIGS. 32A, B illustrate an example implementation of propellant plasma confinement with circumferential propellant flow.

FIGS. 32A, B illustrate an example implementation of propellant plasma confinement with circumferential propellant flow, using, for example, the propellant injection configuration of FIG. 31C. The injection of the propellant into the chamber 3130c may induce circumferential flow illustrated by flow arrows 3235 in FIG. 32A. The longer arrows closer to the nozzle 3132c indicate higher flow velocity. The swirl of the circumferential flow decreases axially away from the nozzle 3132c, as indicated by the decreasing size of flow arrows 3235.

Figure 32B:
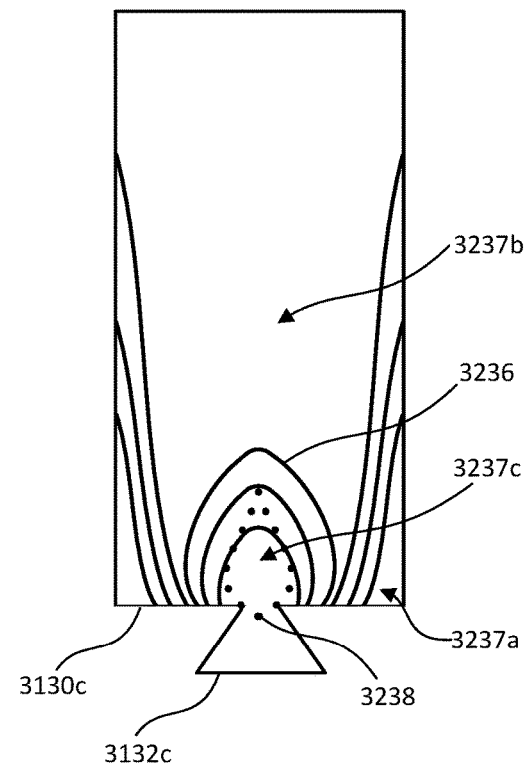

FIG. 32B illustrates, with solid contour lines 3236, a pressure distribution in a cross-section view of the chamber 3130c. The pressure distribution has a high pressure region 3237a along the circumference at the end of the chamber 3130c with the nozzle 3132c. The mid-pressure region 3237b largely occupies the opposite end of the chamber 3130c. On the nozzle end, a high pressure gradient culminates with a low-pressure region adjacent to the nozzle 3132c. The plasma formed by the partially ionized propellant may then be largely confined within a region 3238 marked by a dotted line. A portion of the plasma may exit the nozzle 3132c at high velocity to form a plume (e.g., plume 3034 in FIG. 30).

Figure 33:
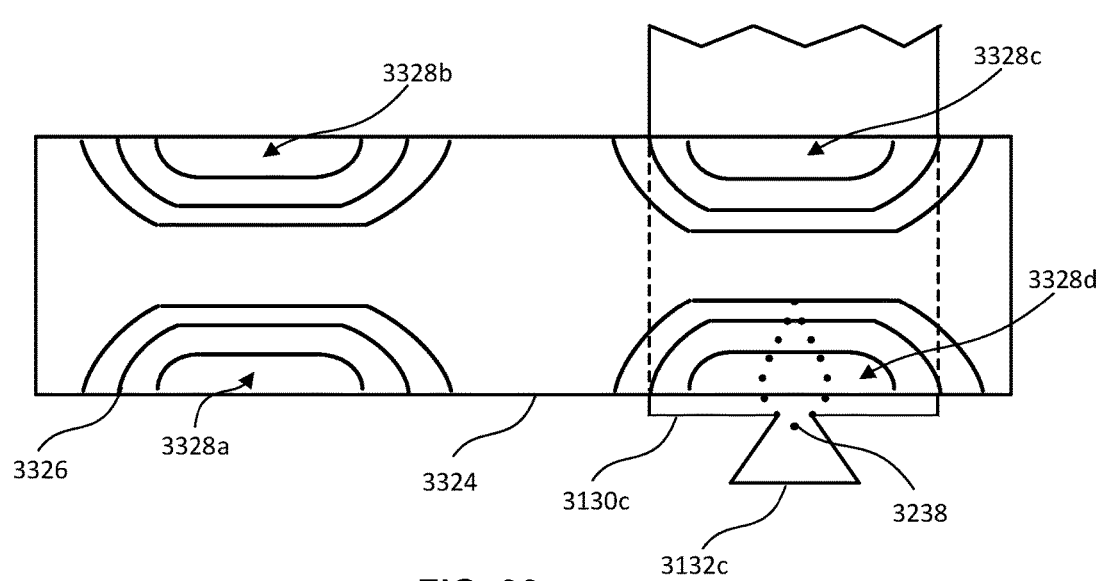
FIG. 33 illustrates an example modal distribution of an electric field in the microwave waveguide of the thruster in FIG. 30.

FIG. 33 illustrates an example modal distribution of an electric field in an example implementation of the microwave waveguide of the thruster in FIG. 30. A waveguide section 3324 may be an implementation of the heating section 3024. Electric field intensity contour lines 3326 delineate intensity regions, with high intensity regions 3328a-c near the walls of the waveguide section 3324. The distribution in FIG. 33 corresponds to a fundamental TM mode. Electric field maxima of the fundamental TM mode may conveniently overlap the low pressure plasma confinement region 3238, facilitating propellant ionization and efficient heating of the propellant.

Figure 34:
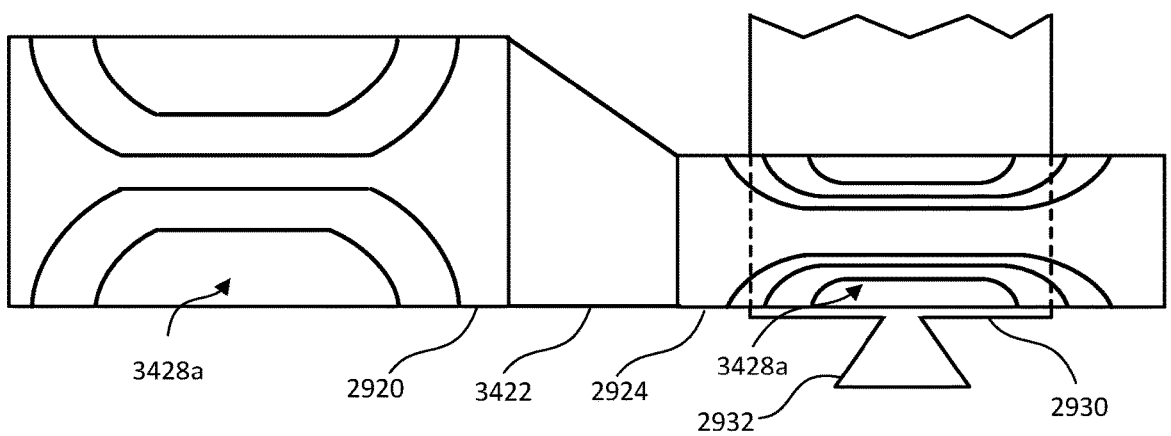
FIG. 34 illustrates electric field strength enhancement using a tapered waveguide section.

FIG. 34 illustrates electric field strength (and energy density) enhancement using a tapered waveguide section 3422 in the waveguide 2920. A peak 3428b of the electric field in the heating section 2924 after the taper section 3422 is higher than a peak 3428a of the electric field before the taper section 3422. The higher field strength of the peak 3428b in the heating section 2924 may facilitate ionization of the propellant and increase efficiency of energy transfer to the propellant.

In some implementations, the taper section 3422 may be adiabatic, gradually squeezing the mode without generating reflections. In other implementations, the taper section 3422 may transfer energy from one mode into another mode or a mixture of modes. The taper section 3422 may transfer energy into a confined evanescent mode when the frequency of the electromagnetic radiation is below the cut-off of the heating section 2924.

Figure 35A:
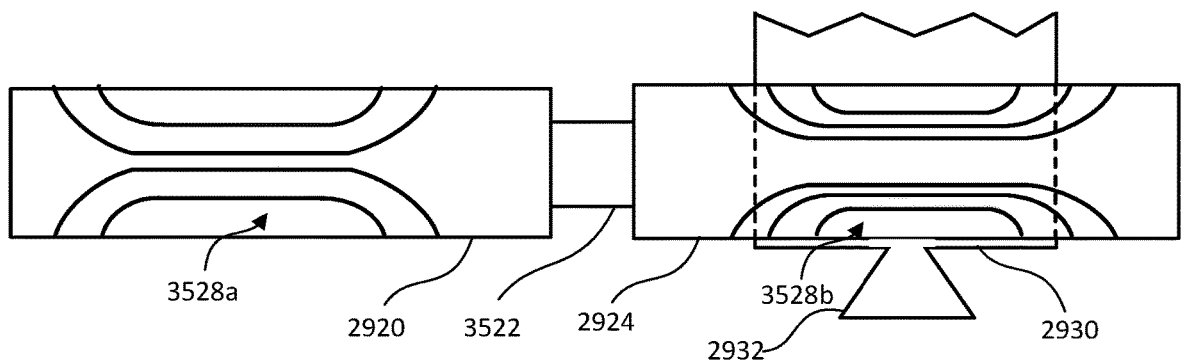
FIGS. 35A, B illustrate electric field strength enhancement using a cavity effect.

FIGS. 35A, B illustrate electric field strength enhancement using a cavity effect. Generally, the heating section 2924 may be disposed between two reflectors, forming a resonant cavity within the waveguide 2920 with an appropriate choice of spacing between the two reflectors (e.g., approximately a multiple of half-wavelengths). The resonant cavity of the heating section 2924 may enhance microwave energy density within the primary propellant chamber 2930.

Figure 35B:
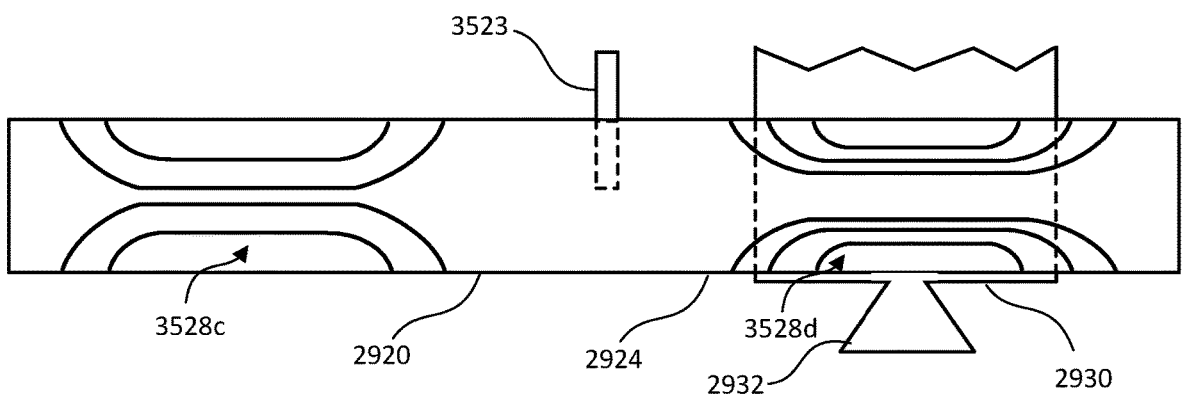

FIG. 35A illustrates field strength enhancement using the cavity effect formed with an aperture coupler 3522. FIG. 35B illustrates field strength enhancement using the cavity effect formed with a conductive insert or stub 3523. A peak 3528b of the field and of the energy density in the heating section 2924 is higher than a peak 3528*a* between the source 2912 and the heating section 2924. Similarly, a peak 3528*d* of the field and of the energy density in the heating section 2924 is higher than a peak 3528*c* between the source 2912 and the heating section 2924. Other ways of implementing reflectors for forming a resonant cavity may include any suitable waveguide discontinuities and/or terminations.

Figure 36:
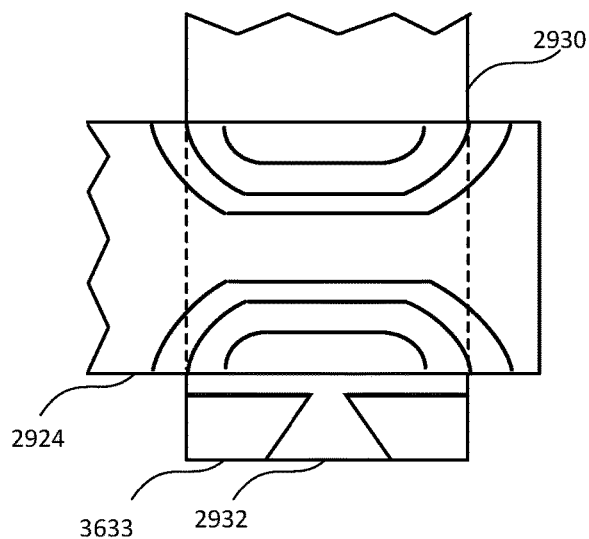
FIG. 36 illustrates a technique for cooling a thruster nozzle using a cooling sleeve.

FIG. 36 illustrates a technique for cooling a thruster nozzle using a cooling sleeve 3533. Cooling the nozzle 2934 may extend the lifetime of the thruster 2910 by slowing down degradation of the nozzle 2932 due to thermal stress that may result from heat imparted to the nozzle 2932 by the heated propellant exiting the thruster 2910. The cooling sleeve 3533 may cool the nozzle 2932 by conducting the heat away from the nozzle 2932 and/or removing the heat by convection. In some implementations, the cooling sleeve 3633 may be a solid thermal mass in thermal contact with the nozzle 2932. The sleeve 3633 may be made of metal or metallic alloy (e.g., copper, aluminum, steel, brass, etc.), a ceramic, or any other suitable material for spreading the heat. The sleeve 3633 implemented with a heat spreader may sink the heat to the chassis of the spacecraft or radiate the heat into space directly. The sleeve 3633 may include radiating fins, or may be in thermal contact with a radiator.

In other implementations, the cooling sleeve 3633 may be in thermal contact with a cooling fluid (e.g., liquid or gas). A cooling system fluidically connected to the cooling sleeve 3633 may circulate the cooling fluid through hollow channels in the cooling sleeve 3633 or along the outer surface. The propellant may be used as the cooling fluid in some implementations.

Additionally or alternatively, a sleeve (e.g., the sleeve 3533) around the nozzle 2932 may be constructed of a microwave absorbing material. The microwave absorbing sleeve may reduce the leakage of microwaves from the thruster 2910.

Figure 37:
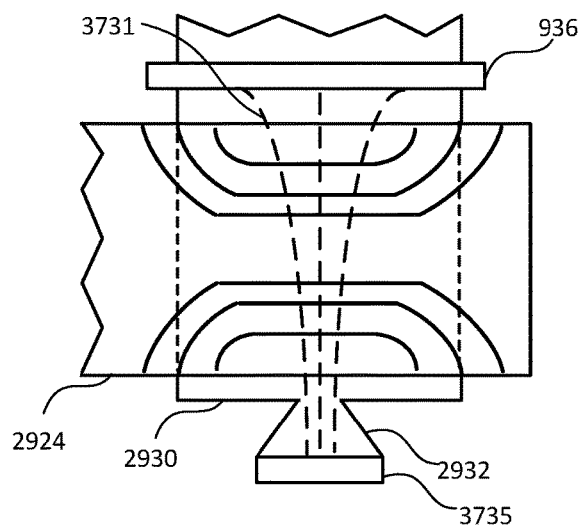
FIG. 37 illustrates a technique for using a static magnetic field to guide ionized propellant along magnetic field lines.

FIG. 37 illustrates a technique for using a static magnetic field to confine or guide ionized propellant through the chamber 2930 along magnetic field lines 3731 represented with long-dashed lines. To that end a magnet 3733 (i.e., magnetic dipole) may surround the nozzle 2932. The magnet 3733 may be a permanent magnet or an electromagnet. The magnet may 3733 have an annular shape, with the opening to allow plasma to escape. In some implementations, the nozzle 2932 may be made from a magnetic material or have a coil of an electromagnet built in. Additionally or alternatively, a secondary magnet 3736 (permanent or an electromagnet) may be disposed at a different location around the chamber 2930 to shape the magnetic field lines 3731. The propellant pressure in the chamber 2930 may be kept low (e.g., less than a Torr) for the electron cyclotron frequency to be significantly less than the electron neutral collision frequency to efficiently accelerate plasma along the magnetic field lines 3731.

Figure 38:
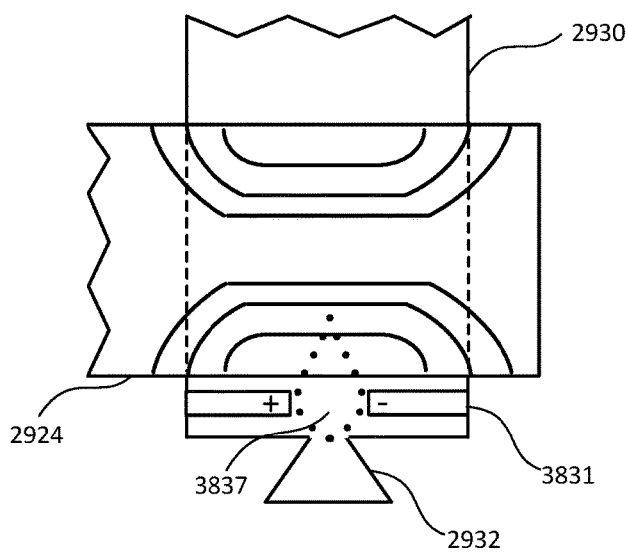
FIG. 38 illustrates an example thruster with a secondary ionization device disposed in the propellant chamber of the thruster.

FIG. 38 illustrates an example thruster with a secondary ionization device 3831 disposed in the propellant chamber 2930 of the thruster 2910. The secondary ionization device 3831 may initiate the breakdown of the propellant within the chamber 2930, facilitating further absorption of energy from the microwave source 2912. The secondary ionization device 3831 may be a spark gap (e.g., inducing plasma breakdown by applying high voltage across a gap), a flash tube, a laser, or any other suitable ionization device.

Figure 39:
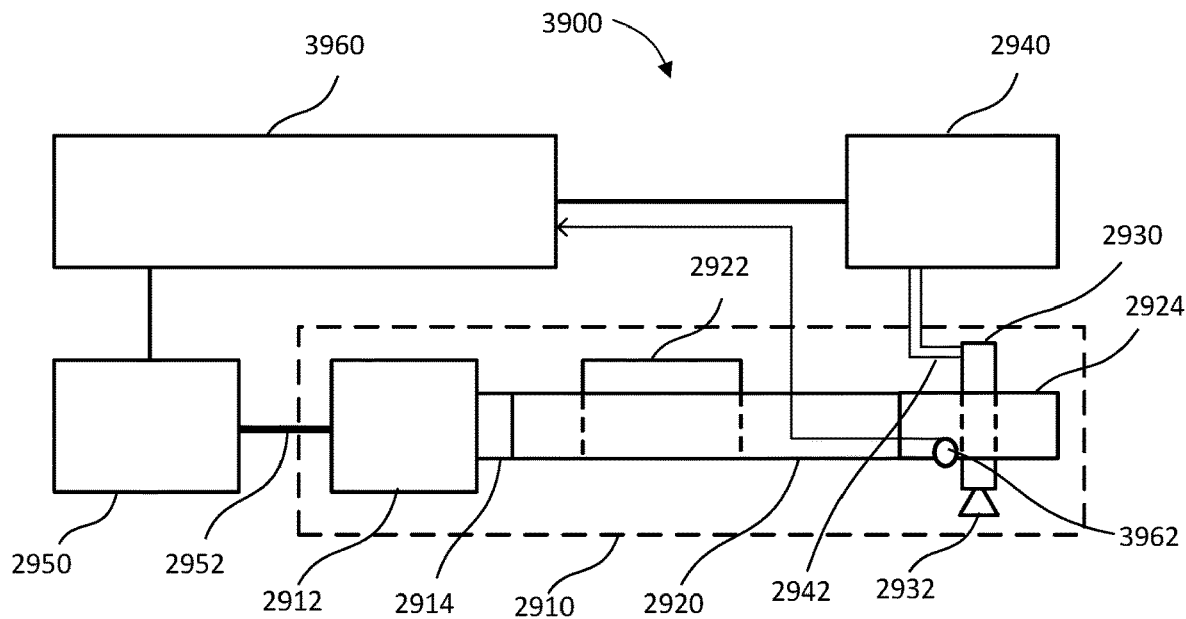
FIG. 39 illustrates an example propulsion system with closed-loop control based on sensor data indicative on amount of energy absorbed by the propellant.

FIG. 39 illustrates an example propulsion system 3900 (an example implementation of the system 2900) with a controller 3960 configured to implement closed-loop control based on data indicative of an amount of energy or power absorbed by the propellant. The system 3900 may include a sensor 3962, possibly in combination with a microwave probe or a coupler, configured to generate a signal indicative of the amount of energy absorbed by the propellant in the propellant chamber 2930. In some implementations, the sensor 3962 may measure the strength of the electromagnetic fields. In other implementations, the sensor 3962 may measure temperature of the plasma (e.g., using contact or radiometric techniques). Still in other implementations, the sensor 3962 may measure a degree of ionization (e.g., using conductivity measurements).

The controller 3960 may adjust operation of the propulsion system 3900 based at least in part on data indicative of the amount of energy or power absorbed by the propellant. In some implementations, the controller 3960 may adjust the power supplied to the microwave source 2912 by the power source 2950. In other implementations, the controller 3960 may tune the phase or frequency of the microwave radiation delivered by the microwave source 2912 to the heating section 2924 of the waveguide 2920. The controller 3960 may adjust the property of the source 2912 or may tune the tuning section 2922 to maximize the power absorbed by the propellant, which may be at least partially ionized.

Figure 40A:
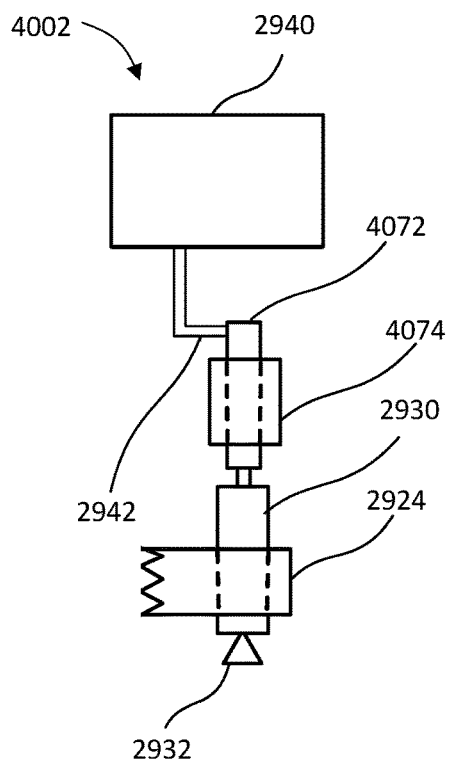
FIGS. 40A, B illustrate example pierced-waveguide thruster configurations with two propellant chambers.

FIGS. 40A, B illustrate, respectively, example piercedwaveguide thruster configurations 4002, 4004 with two propellant chambers. In FIG. 40A, a secondary propellant chamber 4072 is fluidically connected to the propellant management system 2940 and the primary propellant chamber 2930. The propellant supplied by the propellant management system 2940 flows into the ingress port of the primary propellant chamber 2930 via the secondary propellant chamber 4072. The configuration 4002 may include a heater 4074 as a secondary energy source for heating the propellant. The heater may be an electric heater, an electromagnetic heater, a solar heater, etc. The heater 4074 may be configured to heat the propellant in the secondary chamber 4072 and the heated propellant may then flow into the primary chamber 2930 via an ingress (e.g., 3131*a-c*). The propellant in the primary chamber may be further heated by a microwave source (e.g., source 2912). In some implementations, the microwave energy delivered via the waveguide heating section 2924 may ionize propellant in the primary chamber 2930. In other implementations, the propellant may be ionized by other means (e.g., an electric arc device such as a spark plug, a laser, a flash lamp, etc.). The ionized propellant may more readily absorb microwave energy to increase propellant enthalpy.

The propellant pressure in the secondary propellant chamber 4076 may be different from the propellant pressure in the primary propellant chamber 2930. For example, a higher propellant pressure in the secondary propellant chamber 4072 may lead to an improved energy efficiency of the thruster 2910 by establishing a reservoir of preheated propellant for use in the primary propellant chamber 2930 to generate thrust. The pressure in the secondary chamber 4072 may be higher than the pressure in the primary chamber by a factor of 2, 5, 10, 20, 50, 100, or any other suitable factor. In some implementations, the pressure in the primary propellant chamber 2930 may remain low to reduce molecular collision frequency. For example, when the thruster configuration 4002 includes cyclotron acceleration of ionized propellant plasma, the collision (e.g., electron-neutral, ion-neutral, etc.) frequency may be kept below the cyclotron frequency.

The primary propellant chamber 2930 may be configured with a magnet disposed at or near the primary chamber 2930. As discussed with reference to FIG. 37, ionized propellant may accelerate along magnetic field lines, particularly when the pressure in the primary chamber 2930 is suitably low.

Figure 40B:
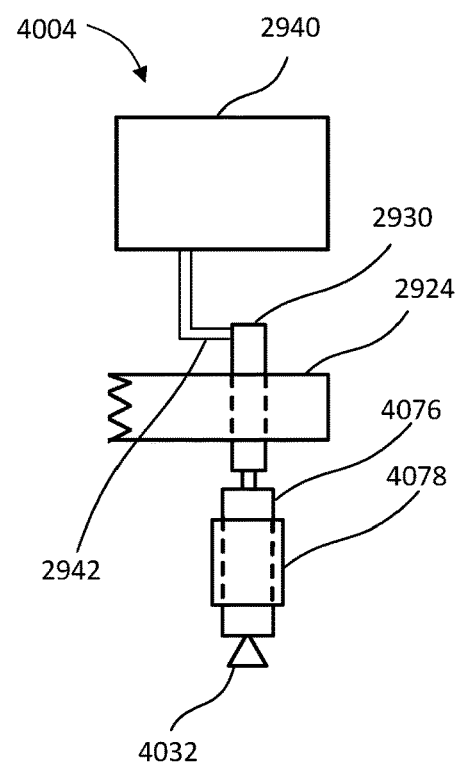

In the configuration 4004 of FIG. 40B, a secondary propellant chamber 4076 is downstream from the primary propellant chamber 2930. The egress port of the primary propellant chamber 2930 is configured to guide the heated propellant exiting the primary propellant chamber 2930 to the secondary propellant chamber 4076. The secondary propellant chamber 4076 includes a nozzle 4032 configured to guide the heated propellant out of the secondary propellant chamber 4076 converting propellant enthalpy into thrust. The configuration 4004 may include a secondary energy source 4078 (e.g., a heater, an electromagnetic energy source) to add energy to the propellant in the secondary propellant chamber 4076, further heating propellant to generate an increase in thrust. The two-stage (two-chamber and two-energy-source) configuration 4004 may lead to achieving higher propellant gas temperatures with greater energy efficiency than a single stage.

In some implementations, the second thruster stage including the secondary propellant chamber 4076 and the secondary energy source 4078 may be a radio-frequency or a microwave heating device with the cyclotron frequency equal to the secondary energy source frequency. In other implementations, the second stage may be another pierced waveguide stage. Still in other implementations, the second stage may be a microwave electro-thermal (MET) thruster.

The fluidic connection between the primary chamber 2930 and the secondary chamber 4076 may include a taper or a restriction to configure the secondary chamber 4076 with significantly lower pressure than the primary chamber 2930. For example, the primary pressure may be larger than 10 or even larger than 100 Torr, while the secondary pressure may be lower than 1 Torr, particularly when the second stage is a cyclotron stage.

It should be noted that a pierced-waveguide thruster (e.g., thruster 2910) and the associated propulsion system (e.g., system 2900) may operate within the spacecraft 100 illustrated with the block diagram in FIG. 1. For example, the propellant system 190 may include the propellant management system 2940. The first thruster 182 and/or the second thruster 184 may be a pierced waveguide thruster (e.g., thruster 2910). Furthermore, any combination of subsystems, units, or components of the spacecraft 100 involved in determining, generating, and/or supporting spacecraft propulsion (e.g., the mechanism control 130, the propulsion control 140, the flight computer 150, the power system 170, the thruster system 180, and the propellant system 190) may be collectively referred to as a propulsion system of the spacecraft 100. The propulsion system 2900 may be at least a portion of the thruster system 180. Additionally, any portion or combination of the mechanism control 130 and/or propulsion control 140a may implement any respective portion or combination of the mechanism control 2930 and/or propulsion control 2940.

The following list of aspects reflects a variety of the embodiments explicitly contemplated by the present disclosure.

Aspect 1. A thruster system for use in a spacecraft comprises a microwave source; a resonant cavity coupled to the microwave source, wherein the microwave source is configured to generate a standing wave field in the resonant cavity; a nozzle provided at one end of the resonant cavity; and at least one injector configured to inject propellant into the resonant cavity so as to create a rotating circumferential flow; wherein the standing wave field raises a temperature of the injected propellant to provide thrust by way of a hot gas exiting the resonant cavity via the nozzle.

Aspect 2. The thruster system of aspect 1, further comprising: an annular structure extending into the resonant cavity to support the at least one injector, wherein the annular structure determines a point along a thrust axis and a radial distance from the thrust axis where the propellant enters the resonant cavity.

Aspect 3. The thruster system of aspect 2, wherein the at least one injector includes a channel within the annular structure, and wherein at least a portion of the channel is not parallel to the thrust axis to inject the propellant into the resonant cavity at an angle relative to the thrust axis.

Aspect 4. The thruster system of aspect 2, wherein the at least one injector includes a capillary configured to deliver the propellant into the resonant cavity.

Aspect 5. The thruster system of aspect 2, wherein the annular structure is made of a dielectric material.

Aspect 6. The thruster system of aspect 2, wherein the annular structure surrounds the nozzle.

Aspect 7. The thruster system of any of any of the preceding aspects, comprising a plurality of injectors equally spaced apart along a circumference around the nozzle.

Aspect 8. The thruster system of any of any of the preceding aspects, wherein the resonant cavity is cylindrical.

Aspect 9. The thruster system of aspect 8, wherein the annular structure has a varying inner diameter that decreases along a direction of the thrust, for at least a portion of a height of the annular structure measured along the thrust axis.

Aspect 10. A method in a spacecraft for operating a thruster that includes a microwave source, a resonant cavity, and a source of propellant which the thruster uses to generate thrust, the method comprising: injecting a propellant into the resonant cavity, including imparting angular momentum to the injected propellant; and causing the microwave source to generate a standing wave within the resonant cavity to raise a temperature of the injected propellant and provide thrust by way of a hot gas exiting the resonant cavity via the nozzle, wherein the angular momentum imparted to the injected propellant produces a rotating circumferential flow of the hot gas within the resonant cavity.

Aspect 11. The method of aspect 10, wherein imparting the angular momentum to the injected propellant includes rotating a structure including the resonant cavity relative to a housing of the spacecraft, along a thrust axis.

Aspect 12. The method of aspect 10, wherein imparting the angular momentum to the injected propellant includes injecting the propellant into the resonant cavity at an angle relative to a thrust axis.

Aspect 13. A method in a spacecraft for operating a thruster that includes a microwave source, a resonant cavity, and a source of propellant which the thruster converts to hot gas and directs via a nozzle to generate thrust, the method comprising: operating the thruster in an ignition mode in which the microwave source outputs power at a first rate; and operating the thruster in a propulsion mode in which the microwave source outputs power at a second rate higher than the first rate.

Aspect 14. The method of aspect 13, further comprising: transitioning from the ignition mode to the propulsion mode when at least a portion of the propellant is ionized.

Aspect 15. The method of aspect 13, further comprising: injecting the propellant into the resonant cavity at a first rate while the thruster operates in the ignition mode; and injecting the propellant into the resonant cavity at a second rate higher than the first rate while the thruster operates in the propulsion mode.

Aspect 16. The method of aspect 15, further comprising: ramping up a rate at which the propellant is injected into the resonant cavity from the first rate to the second rate in response to the determining that the at least a portion of the propellant is ionized.

Aspect 17. The method of aspect 16, further comprising: increasing the rate at which the microwave source outputs power, starting prior to ramping up the rate at which the propellant is injected into the resonant cavity.

Aspect 18. A method in a spacecraft for operating a thruster that includes a microwave source, a resonant cavity, and a source of propellant which the thruster uses to generate thrust, the method comprising: injecting the propellant into the resonant cavity at a first flow rate; causing the microwave source to generate power for application to the injected propellant resonant cavity until at least a portion of the propellant is ionized, at a second time subsequent to the first time; and injecting the propellant into the resonant cavity at a second flow rate higher than the first flow rate, subsequently to the second time.

Aspect 19. The method of aspect 18, further comprising: causing the microwave source to generate power at a first rate prior to a time when the at least a portion of the propellant is ionized; and causing the microwave source to generate power at a second rate higher than the first rate when the propellant is injected into the resonant cavity at the second flow rate.

Aspect 20. The method of aspect 19, further comprising: causing the microwave source to start increasing the power prior to ramping up the rate at which the propellant is injected into the resonant cavity from the first rate to the second rate.

Aspect 21. A thruster system comprising: a microwave source; a resonant cavity coupled to the microwave source, wherein the microwave source is configured to generate a standing wave field in the resonant cavity; a nozzle provided at one end of the resonant cavity; at least one injector configured to inject propellant into the resonant cavity; and a controller configured to operate the thruster system according to any of aspects 13-20.

Aspect 22. A thruster comprising: a cavity in which a propellant is heated to generate hot gas; a top plate disposed at one end of the cavity, the top plate made of a first material having a first coefficient of thermal expansion $\alpha 1$; a nozzle embedded in the top plate, the nozzle made of a second material having a second coefficient of thermal expansion $\alpha 2$ different from $\alpha 1$; and an insert disposed between the nozzle and the top plate, the insert made of a third material selected so as to reduce stress on the nozzle due to a difference in thermal expansion of the nozzle and the top plate when the hot gas exits the cavity via the nozzle to generate thrust.

Aspect 23. The thruster of aspect 1, wherein the third material has a third coefficient thermal expansion $\alpha 3$ different from $\alpha 1$ and $\alpha 2$.

Aspect 24. The thruster of aspect 23, wherein $\alpha 3$ is smaller than $\alpha 2$.

Aspect 25. The thruster of aspect 23 or 24, wherein $\alpha 3$ is smaller than $\alpha 1$.

Aspect 26. The thruster of aspect 24, wherein each of the top plate, the nozzle, and the insert has an annular structure of radius R1, R2, and R3, respectively.

Aspect 27. The thruster of aspect 22, wherein the insert is elastic.

Aspect 28. The thruster of aspect 22, wherein the first material is steel.

Aspect 29. The thruster of aspect 22, wherein the second material is a ceramic material.

Aspect 30. The thruster of aspect 22, wherein the nozzle has a ceramic coating.

Aspect 31. The thruster of aspect 22, wherein the cavity is cylindrical.

Aspect 32. The thruster of aspect 22, wherein the cavity is a resonant cavity configured to generate a standing wave field based on an output of a microwave source.

Aspect 33. A thruster system for use in a spacecraft, the thruster system comprising: a microwave source; a resonant cavity coupled to the microwave source, wherein the microwave source is configured to generate a standing wave field in the resonant cavity; an injector configured to inject propellant into the resonant cavity; a nozzle provided at one end of the resonant cavity; and an annular structure extending into the resonant cavity, the annular structure configured to reduce a radius of the resonant cavity near the nozzle to improve vorticity of a hot gas exiting the resonant cavity via the nozzle.

Aspect 34. The thruster system of aspect 33, wherein annular structure is shaped as a frustum with a narrower diameter near the nozzle and a wider diameter farther away from the nozzle, along a thrust axis of the thruster system.

Aspect 35. The thruster system of aspect 33 or 34, wherein the annular structure is made of a dielectric material.

Aspect 36. The thruster system of any of aspects 33-35, wherein the annular structure support the injector and determines a point along a thrust axis and a radial distance from the thrust axis where the propellant enters the resonant cavity.

Aspect 37. The thruster system of any of aspects 33-36, wherein the annular structure surrounds the nozzle.

Aspect 38. A thruster comprising: a cavity in which a hot gas is generated using a propellant; an injector configured to deliver the propellant into the cavity; a top plate disposed at one end of the cavity; and an adapter configured to receive a nozzle and removeably attach to the top plate; wherein the hot gas exits cavity via the nozzle to generate thrust.

Aspect 39. The thruster of aspect 38, wherein the adapter includes a flange to mate with an annular structure of the top plate.

Aspect 40. The thruster of aspect 38 or 39, wherein the top plate is integral with a housing of the resonant cavity.

Aspect 41. The thruster of aspect 38, wherein the cavity is a resonant cavity, the thruster further comprising a microwave source configured to generate a standing wave field in the resonant cavity.

Aspect 42. A thruster system for use in a spacecraft, the thruster system comprising: a microwave source; a cylindrical resonant cavity with a diameter that varies along a direction of the thrust, for at least a portion of a height of the resonant cavity, the resonant cavity coupled to the microwave source which generates a standing wave field in the resonant cavity; a nozzle provided at one end of the resonant cavity; and at least one injector configured to inject propellant into the resonant cavity; wherein the standing wave field raises a temperature of the injected propellant to provide thrust by way of a hot gas exiting the resonant cavity via the nozzle.

Aspect 43. The thruster system of aspect 42, wherein the resonant cavity includes: a first section proximal to the nozzle having a first constant diameter; a second section distal to the nozzle having a second constant diameter greater than the first timer.

Aspect 44. The thruster system of aspect 43, wherein the resonant cavity further a third section in which the diameter varies linearly along the direction of the thrust between the first diameter and the second diameter, the third section disposed between the first section and the second section.

Aspect 45. The thruster system of aspect 42, wherein the resonant cavity includes: a first section proximal to the nozzle in which a diameter increases in proportion with a distance from the nozzle; and a second section distal to the nozzle in which a diameter decreases in proportion with a distance from the nozzle.

Aspect 46. A method for operating a microwave electrothermal thruster (MET) system of a spacecraft, the method comprising: causing a plurality of microwave generators to generate a plurality of respective signals; combining power of at least several of the plurality of generated signals, including: adjusting a phase of each of the plurality of generated signals, and directing the plurality of phase-shifted signals to a switching network; and providing an output of the switching network to at least one resonant cavity of a respective MET thruster.

Aspect 47. The method of aspect 46, wherein further comprising phase-locking the plurality of microwave generators.

Aspect 48. The method of aspect 47, wherein adjusting the phase of each of the plurality of generated signals includes using a phase adjustment network; the method further comprising: tuning the phase adjustment network to cause the plurality of microwave generators to become phase-locked.

Aspect 49. The method of aspect 46, wherein adjusting the phase of each of the plurality of generated signals includes using filters.

Aspect 50. The method of aspect 46, wherein adjusting the phase of each of the plurality of generated signals includes using delay lines.

Aspect 51. The method of aspect 46, wherein the switching network includes a combiner.

Aspect 52. The method of aspect 46, including providing the output of the switching network to a single MET thruster.

Aspect 53. The method of aspect 46, including providing a first portion of the output of the switching network to a first MET thruster, and a second portion of the output of the switching network to a second MET thruster.

Aspect 54. The method of aspect 46, further comprising: providing redundancy to the at least one MET thruster by selectively directing a first signal from a first one of the plurality of microwave generators or a second signal from a second one of the plurality of microwave generators to the at least one MET thruster, in accordance with respective operational statuses of the first and second microwave generators.

Aspect 55. A redundant microwave electrothermal thruster (MET) system of a spacecraft, the system comprising: a plurality of microwave generators to generate a plurality of respective signals; and a switching network configured to receive the plurality of respective signals and direct at least a subset of the plurality of signals to one or more MET thrusters of the spacecraft.

Aspect 56. The MET system of aspect 55, wherein the switching network is configured to selectively direct a first signal from a first one of the plurality of microwave generators or a second signal from a second one of the plurality of microwave generators to a MET thruster included in the one or more MET thrusters, in accordance with respective operational statuses of the first and second MET microwave generators.

Aspect 57. The MET system of aspect 55, wherein the switching network includes a combiner and is configured to (i) combine, using the combiner, a first signal from a first one of the plurality of microwave generators with a second signal from a second one of the plurality of microwave generators to generate a combined output, and (ii) direct the combined signal to a MET thruster included in the one or more MET thrusters.

Aspect 58. The MET system of any of aspects 55-57, further comprising: a plurality of phase adjusters coupled to the plurality of microwave generators and configured to adjust a phase of each of the plurality of signals.

Aspect 59. The MET system of aspect 58, wherein the plurality of phase adjusters includes one or more delay lines.

Aspect 60. The MET system of aspect 58, wherein the plurality of phase adjusters includes one or more filters.

Aspect 61. The MET system of any of aspects 55-60, further comprising: a controller coupled to the switching network, the controller configured to control the switching network to direct the signals generated the plurality of microwave generators to the one or more MET thrusters.

Aspect 62. The MET system of aspect 61, wherein the controller is configured to (i) detect a failure of one of the plurality of microwave generators coupled to a MET thruster included in the one or more MET thrusters, and (ii) in response to detected failure, redirect output of another one of the plurality of microwave generators to the MET thruster, using the switching network.

Aspect 63. The MET system of any of aspects 55-62, wherein the switching network includes one or more mechanical relays.

Aspect 64. The MET system of any of aspects 55-62, wherein the switching network includes one or more solid-state switches.

Aspect 65. A method of manufacturing a thruster of a spacecraft, the thruster including a cavity and a nozzle, the method comprising: operating the thruster in a first operational mode prior to deployment of the thruster in space, including: injecting a coating mix including at least one coating material into the cavity, and causing a first hot gas including the coating mix to exit the cavity via the nozzle, thereby coating a throat of the nozzle with the coating material; wherein the thruster, when operating in space in a second operational mode, receives a propellant to generate a second hot gas and produces thrust by expelling the second hot gas via the nozzle.

Aspect 66. The method of aspect 65, wherein causing the nozzle with the coating material includes depositing oxide ceramics onto the throat of the nozzle.

Aspect 67. The method of aspect 65, wherein coating the nozzle with the coating material includes depositing non-oxide ceramics onto the throat of the nozzle.

Aspect 68. The method of aspect 65, wherein coating the nozzle with the coating material includes depositing oxide ceramics onto the throat of the nozzle.

Aspect 69. The method of aspect 65, wherein coating the nozzle with the coating material includes depositing a refractory metal onto the throat of the nozzle.

Aspect 70. The method of aspect 69, wherein the refractory metal is tungsten.

Aspect 71. The method of aspect 65, wherein coating the nozzle with the coating material includes depositing a diamond film onto the throat of the nozzle.

Aspect 72. The method of aspect 65, wherein coating the nozzle with the coating material includes depositing a sapphire film onto the throat of the nozzle.

Aspect 73. The method of aspect 65, wherein the coating material is a chemical product of a coating agent, and wherein the coating mix includes the coating agent.

Aspect 74. The method of aspect 65, wherein the coating material protects the nozzle from oxidation.

Aspect 75. The method of aspect 65, wherein the coating mix includes silicon and oxygen to produce a silicon dioxide coating of the throat of the nozzle.

Aspect 76. A method of operating a thruster of a spacecraft, the thruster including a cavity and a nozzle, the method comprising: operating the thruster in a first operational mode, including: injecting a coating mix including at least one coating material into the cavity, and causing a first hot gas including the coating mix to exit the cavity via the nozzle, thereby coating a throat of the nozzle with the coating material; and operating the thruster in a second operational mode, including injecting a propellant to generate a second hot gas to produce thrust by expelling the second hot gas via the nozzle.

Aspect 77. The method of aspect 76, wherein: operating the thruster in the first operational mode includes generating a first amount of thrust; and operating the thruster in the second operational mode includes generating a second amount of thrust greater than the first amount of thrust.

Aspect 78. The method of aspect 76, wherein causing the nozzle with the coating material includes depositing oxide ceramics onto the throat of the nozzle.

Aspect 79. The method of aspect 76, wherein coating the nozzle with the coating material includes depositing non-oxide ceramics onto the throat of the nozzle.

Aspect 80. The method of aspect 76, wherein coating the nozzle with the coating material includes depositing a refractory metal onto the throat of the nozzle.

Aspect 81. The method of aspect 80, wherein the refractory metal is tungsten.

Aspect 82. The method of aspect 76, wherein coating the nozzle with the coating material includes depositing a diamond film onto the throat of the nozzle.

Aspect 83. The method of aspect 76, wherein coating the nozzle with the coating material includes depositing a sapphire film onto the throat of the nozzle.

Aspect 84. The method of aspect 76, wherein the coating material is a chemical product of a coating agent, and wherein the coating mix includes the coating agent.

Aspect 85. The method of aspect 76, wherein the coating material protects the nozzle from oxidation.

Aspect 86. The method of aspect 76, wherein the coating mix includes silicon and oxygen to produce a silicon dioxide coating of the throat of the nozzle.

Aspect 87. The method of aspect 76, including: injecting the coating mix into the cavity via a first injector, and injecting the propellant into the cavity via a second injector.

Aspect 88. The method of aspect 76, including controlling a flow rate through each of the first injector and the second injector via a respective valve.

Aspect 89. A thruster system for use in a spacecraft, the thruster system comprising: a microwave source; a cylindrical housing of a resonant cavity; a waveguide to couple the microwave source to the resonant cavity, the waveguide shaped so as to abut the cylindrical housing along at least a portion of a circumference of the cylindrical housing, to increase coupling efficiency.

Aspect 90. The thruster system of aspect 89, wherein the waveguide has a rectangular cross-section.

Aspect 91. The thruster system of aspect 89 or 90, wherein the waveguide includes an aperture in a section that abuts the cylindrical housing, to couple an electromagnetic field generated by the microwave source into the resonant cavity.

Aspect 92. The thruster system of aspect 89 or 90, wherein the waveguide includes a plurality of apertures in a section that abuts the cylindrical housing, each of the plurality of apertures configured to couple an electromagnetic field generated by the microwave source into the resonant cavity.

Aspect 93. The thruster system of aspects 91 or 92, wherein each aperture has a longer dimension parallel to an axis of the cylindrical housing and a shorter dimension.

Aspect 94. A thruster system for use in a spacecraft, the thruster system comprising: a microwave source configured to generate an electromagnetic signal; a resonant cavity coupled to the microwave source, wherein the microwave source is configured to generate a standing wave field in the resonant cavity; a ferrite insert disposed within the resonant cavity; a magnet disposed outside the resonant cavity and configured to exert a magnetic bias field on the ferrite insert to thereby modify electromagnetic properties of the ferrite insert and tune the resonant frequency of the resonant cavity.

Aspect 95. The thruster system of aspect 94, wherein the magnet is an electromagnet controlled by a controller.

Aspect 96. The thruster system of aspect 95, wherein the controller is configured to: not activate the electromagnet prior to determining that at least a portion of a propellant is ionized in the resonant cavity; and activate the electromagnet in response to determining that at least a portion of a propellant is ionized in the resonant cavity.

Aspect 97. The thruster system of aspect 94, wherein: the resonant cavity is disposed in a cylindrical housing; a nozzle of the thruster is disposed at a first end of the cylindrical housing, and the magnet is placed outside a second end of the cylindrical housing.

Aspect 98. The thruster system of aspect 94, wherein: the resonant cavity is disposed in a cylindrical housing; and the magnet is placed outside a vertical wall of the cylindrical housing.

Aspect 99. A method in a spacecraft for operating a thruster that includes a microwave source, a resonant cavity, and a source of propellant which the thruster converts to hot gas and directs via a nozzle to generate thrust, the method comprising: operating the thruster in an ignition mode in which the propellant is not ionized; and operating the thruster in a propulsion mode in which at least a portion of the propellant is ionized to generate plasma, including automatically tuning the resonant cavity to counteract an impact of the generated plasma on resonant frequencies of the resonant cavity.

Aspect 100. The method of aspect 99, wherein tuning the resonant cavity includes activating a magnet disposed outside a housing of the resonant cavity, the magnet exerting a magnetic bias field on a ferrite insert disposed inside the resonant cavity.

Aspect 101. The method of aspect 99, wherein the magnet is an electromagnet, the method including controlling the electromagnet using a controller.

Aspect 102. A thruster comprising: a cavity in which a propellant is heated to generate hot gas; a top plate disposed at one end of the cavity; a nozzle embedded in the top plate; and a nozzle insert made of a refractory metal and configured to fit inside a throat of the nozzle to reduce oxidation of the nozzle.

Aspect 103. The thruster of aspect 102, wherein the refractory metal includes iridium.

Aspect 104. The thruster of aspect 102, wherein the refractory metal includes niobium.

Aspect 105. The thruster of aspect 102, wherein the refractory metal includes a plurality of layers of different metals.

Aspect 106. A method of operating a thruster of a spacecraft, the thruster including a cavity and a nozzle, the method comprising: providing a propellant to the cavity via a propellant supply line; injecting a coating mix including at least one coating material into the propellant supply line, so that a mixture of the propellant and the coating mix is injected into the cavity; and operating the thruster to generate a hot gas inside the cavity and produce thrust by expelling the hot gas from the cavity via the nozzle, including causing the hot gas to coat a throat of the nozzle with the coating material to protect the nozzle from oxidation.

Aspect 107. The method of aspect 106, wherein causing the hot gas to coat the throat of the nozzle with the coating material includes depositing at least one of (i) oxide ceramics, (ii) non-oxide ceramics, (iii) a refractory metal, (iv) a diamond film, or (v) a sapphire film onto the nozzle.

Aspect 108. The method of aspect 106, including controlling a rate of injecting the coating mix into the propellant supply using a first valve, and controlling a rate of providing the propellant to the cavity using a second valve.

Aspect 109. A multi-mode thruster system for use in a spacecraft, the thruster system comprising: a microwave source; a cavity coupled to the microwave source and including a first inlet to receive a first fluid and a second inlet to receive a second fluid; and a nozzle provided at one end of the cavity; wherein: the thruster operates in a microwave electrothermal thruster (MET) mode to (i) generate a standing wave in the cavity using the microwave source and (ii) raise a temperature of the first fluid to generate a first hot gas that exits the cavity via the nozzle to generate thrust; and the thruster operates in a chemical propulsion mode to (i) produce a reduction-oxidation reaction between the first fluid and the second fluid and (ii) generate a second hot gas that exits the cavity via the nozzle to generate thrust.

Aspect 110. The multi-mode thruster system of aspect 109, wherein the cavity receives at least one of (i) water, (ii) hydrozene, (iii) hydrogen peroxide, or (iii) ammonia as the first fluid via the first inlet when the thruster operates in the MET mode.

Aspect 111. The multi-mode thruster system of aspect 109 or 110, wherein the cavity operates as a resonant cavity when the thruster operates in the MET mode.

Aspect 112. The multi-mode thruster system of any of aspects 109-111, wherein the cavity receives an oxidation agent via the first inlet and a reducing agent via the second inlet when operating in the chemical propulsion mode.

Aspect 113. The multi-mode thruster system of aspect 109, wherein the first inlet receives a same fluid in the MET mode and the chemical propulsion mode, and wherein the fluid operates as propellant in the MET mode and as an oxidation agent in the chemical propulsion mode.

Aspect 114. The multi-mode thruster system of aspect 113, wherein the first fluid includes hydrogen peroxide.

Aspect 115. The multi-mode thruster system of any of aspects 109-114, further comprising a controller configured to: activate the MET mode in response to determining that the spacecraft requires a first amount of thrust; and activate the chemical propulsion mode in response to determining that the spacecraft requires a second amount of thrust larger than the first amount of thrust.

Aspect 116. The multi-mode thruster system aspect 109, wherein: in the MET mode, the first fluid is water; and in the chemical propulsion mode, the first fluid is oxygen and the second fluid is hydrogen.

Aspect 117. The multi-mode thruster system of aspect 116, further comprising: a propellant tank configured to store water; and a fuel cell configured separately store oxygen and hydrogen.

Aspect 118. A thruster system for use in a spacecraft, the thruster system comprising: a microwave source configured to generate microwave energy; a waveguide coupled the microwave source; a propellant compartment fluidicly coupled to a propellant supply line to receive a propellant; and a nozzle disposed at one end of the propellant compartment; wherein the propellant compartment is disposed through the wave guide, so that the waveguide delivers the microwave energy to the propellant within the propellant compartment to heat up the propellant and generate thrust in a form of hot gas existing the propellant compartment via the nozzle.

Aspect 119. The thruster system of aspect 118, wherein the propellant compartment does not operate as a resonant cavity.

Aspect 120. The thruster system of aspect 118, wherein a portion of the waveguide through the propellant compartment is disposed forms a rectangular resonant cavity.

Aspect 121. A thruster system for use in a spacecraft, the thruster system comprising: a microwave source configured to generate microwave energy; a coaxial transmission line coupled the microwave source; a propellant compartment disposed within the coaxial transmission line; and a nozzle disposed at one end of the coaxial transmission line; wherein the waveguide delivers the microwave energy to the propellant within the propellant compartment to heat up the propellant and generate thrust in a form of hot gas existing the propellant compartment via the nozzle.

Aspect 122. The thruster system of aspect 121, wherein a section of the coaxial transmission line proximate to the nozzle forms a resonant cavity.

Aspect 123. The thruster system of aspect 121, wherein a section of the coaxial transmission line is a quarter-wavelength impedance transformer.

Aspect 124. The thruster system of aspect 121, wherein the coaxial transmission line includes a dielectric window to separate a first portion of the coaxial transmission line from a second portion of the coaxial transmission line in which the hot gas is contained.

Aspect 125. The thruster system of aspect 121, wherein the propellant compartment is disposed between a center conductor and a shield of the coaxial transmission line.

What is claimed is:

1. A propulsion system for a space vehicle, the propulsion system comprising:
   a source of microwave energy;
   a waveguide coupled to the source of microwave energy, the waveguide configured to have a propagation direction;
   a primary propellant chamber at least partially disposed within the waveguide, the primary propellant chamber having a chamber wall, an ingress port, and an egress port, and the chamber wall comprising a dielectric material;
   a propellant injection mechanism configured to inject propellant into the primary propellant chamber via the ingress port; and
   a controller configured to:
      cause the propellant injection mechanism to inject the propellant into the primary propellant chamber; and
      cause the source of microwave energy to supply energy to the propellant in the primary propellant chamber through the dielectric material of the chamber wall and via the waveguide to thereby heat the propellant and cause the heated propellant to exit the primary propellant chamber via the egress port.

2. The propulsion system of claim 1, further comprising: a secondary ionization device configured to ionize a portion of the propellant.

3. The system of claim 1, wherein: the waveguide includes a resonant cavity to enhance microwave energy density in the primary propellant chamber.

4. The propulsion system of claim 1, wherein the primary propellant chamber pierces the waveguide orthogonally to the direction of propagation of the waveguide.

5. The propulsion system of claim 1, further comprising: a sensor configured to generate a signal indicative of an amount of energy absorbed by the propellant; and
wherein the controller is configured to either i) cause the propellant injection mechanism to inject the propellant into the primary propellant chamber, or ii) cause the source of microwave energy to supply energy to the propellant in the primary propellant chamber at least in response to the signal indicative of the amount of energy absorbed by the propellant.

6. The propulsion system of claim 5, wherein the sensor configured to generate the signal indicative of the energy absorbed by the propellant is configured to measure either i) a degree of ionization, or ii) a temperature of the propellant in the primary propellant chamber.

7. The propulsion system of claim 1, wherein: the egress port is a nozzle; and
the heated propellant exiting the primary propellant chamber via the nozzle generates thrust.

8. The propulsion system of claim 7, further comprising: a cooling sleeve surrounding the nozzle.

9. The propulsion system of claim 7, further comprising: a magnet disposed at the nozzle so as to guide ionized propellant along magnetic field lines established by the magnet.

10. The propulsion system of claim 1, further comprising: a secondary propellant chamber in fluidic connection with the primary propellant chamber, where in operation the primary propellant chamber is configured to hold propellant at a first pressure, and the secondary propellant chamber is configured to hold propellant at a second pressure different from the first pressure; and
a secondary energy source configured to add heat to the propellant in in the secondary propellant chamber.

11. The propulsion system of claim 10, wherein: the egress port of the primary propellant chamber is configured to guide the heated propellant exiting the primary propellant chamber to the secondary propellant chamber; and
the secondary propellant chamber includes a nozzle configured to guide the heated propellant out of the secondary propellant chamber to produce thrust.

12. The propulsion system of claim 10, wherein: the propellant injection mechanism is further configured to inject the propellant into the ingress port of the primary propellant chamber via the secondary propellant chamber; and
the egress port of the primary propellant chamber is a nozzle configured to guide the heated propellant out of the primary propellant chamber to produce thrust.

13. The propulsion system of claim 12, wherein: the second pressure is at least twice as high as the first pressure; and the propulsion system includes a magnet configured to guide ionized propellant through the primary propellant chamber along magnetic field lines established by the magnet.

14. A method of operating a propulsion system in a space vehicle, the method comprising:
generating microwave energy using a source of microwave energy;
coupling the generated microwave energy to a waveguide, the waveguide configured to have a propagation direction;
injecting, via an ingress port using a propellant injection mechanism controlled by a controller, propellant into a primary propellant chamber at least partially disposed within the waveguide, the chamber wall comprising a dielectric material; and
supplying, via the waveguide and through the dielectric material of the chamber wall, energy to the propellant in the primary propellant chamber to thereby heat the propellant and cause the heated propellant to exit the primary propellant chamber via an egress port.

15. The method of claim 14, further comprising: ionizing a portion of the propellant using a secondary ionization device.

16. The method of claim 14, wherein: the waveguide includes a resonant cavity to enhance microwave energy density in the primary propellant chamber.

17. The method of claim 14, further comprising: generating, using a sensor, a signal indicative of an amount of energy absorbed by the propellant; and
either i) causing, by the controller, the propellant injection mechanism to inject the propellant into the primary propellant chamber, or ii) causing, by the controller, the source of microwave energy to supply energy to the propellant in the primary propellant chamber at least in response to the signal indicative of the amount of energy absorbed by the propellant.

18. The method of claim 17, wherein the sensor generating the signal indicative of the energy absorbed by the propellant measures either i) a degree of ionization, or ii) a temperature of the propellant in the primary propellant chamber.

19. The method of claim 14, wherein: the egress port is a nozzle; and
the heated propellant exiting the primary propellant chamber via the nozzle generates thrust.

20. The method of claim 19, further comprising cooling the nozzle using a cooling sleeve surrounding the nozzle.

21. The method of claim 19, further comprising: guiding ionized propellant along magnetic field lines established by a magnet disposed at the nozzle.

22. The method of claim 14, further comprising: holding, in a secondary propellant chamber in fluidic connection with the primary propellant chamber, propellant at a pressure different from propellant pressure in the primary propellant chamber; and
adding, using a secondary energy source, heat to the propellant in in the secondary propellant chamber.

23. The method of claim 22, wherein: the egress port of the primary propellant chamber is configured to guide the heated propellant exiting the primary propellant chamber to the secondary propellant chamber; and
the secondary propellant chamber includes a nozzle configured to guide the heated propellant out of the secondary propellant chamber to produce thrust.

24. The method of claim 22, wherein:
the propellant injection mechanism is further configured to inject the propellant into the ingress port of the primary propellant chamber via the secondary propellant chamber; and
the egress port of the primary propellant chamber is a nozzle configured to guide the heated propellant out of the primary propellant chamber to produce thrust.

25. The method of claim 24, wherein:
the second pressure is at least twice as high as the first pressure; and
the propulsion system includes a magnet configured to guide ionized propellant through the primary propellant chamber along magnetic field lines established by the magnet.

* * * * *

UNITED STATES PATENT AND TRADEMARK OFFICE
CERTIFICATE OF CORRECTION

PATENT NO. : 11,585,331 B2
APPLICATION NO. : 17/163049
DATED : February 21, 2023
INVENTOR(S) : Jason Hummelt et al.

It is certified that error appears in the above-identified patent and that said Letters Patent is hereby corrected as shown below:

In the Claims

At Column 37, Line 8, "The system of claim" should be -- The propulsion system of claim --.

At Column 37, Line 48, "in in the" should be -- in the --.

At Column 38, Line 48, "comprising" should be -- comprising: --.

At Column 38, Lines 48-49, "cooling the nozzle using a cooling sleeve surrounding the nozzle." should be at Line 49 as a new sub-point.

At Column 38, Line 59, "in in the" should be -- in the --.

Signed and Sealed this
Twenty-ninth Day of August, 2023

Katherine Kelly Vidal
*Director of the United States Patent and Trademark Office*